(12) United States Patent
Chari et al.

(10) Patent No.: US 7,142,670 B2
(45) Date of Patent: Nov. 28, 2006

(54) SPACE-EFFICIENT, SIDE-CHANNEL ATTACK RESISTANT TABLE LOOKUPS

(75) Inventors: Suresh N. Chari, Tarrytown, NY (US); Josyula R. Rao, Briarcliff Manor, NY (US); Pankaj Rohatgi, New Rochelle, NY (US); Helmut Scherzer, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 09/943,720

(22) Filed: Aug. 31, 2001

(65) Prior Publication Data

US 2003/0044003 A1 Mar. 6, 2003

Related U.S. Application Data

(60) Provisional application No. 60/312,204, filed on Aug. 14, 2001.

(51) Int. Cl.
*H04K 1/00* (2006.01)
*H04L 9/00* (2006.01)

(52) U.S. Cl. .................. 380/28; 380/252; 380/268; 713/194; 708/235

(58) Field of Classification Search .............. 380/28, 380/37, 42, 205, 368, 252; 713/189, 194; 708/200, 235, 250
See application file for complete search history.

(56) References Cited

U.S. PATENT DOCUMENTS

| | | | | |
|---|---|---|---|---|
| 6,278,783 B1 * | 8/2001 | Kocher et al. | ............... | 380/277 |
| 6,295,606 B1 * | 9/2001 | Messerges et al. | .......... | 713/189 |
| 6,304,658 B1 * | 10/2001 | Kocher et al. | ................ | 380/30 |
| 6,381,699 B1 * | 4/2002 | Kocher et al. | .............. | 713/172 |
| 6,658,569 B1 * | 12/2003 | Patarin et al. | ............... | 713/194 |
| 6,724,894 B1 * | 4/2004 | Singer | .......................... | 380/28 |
| 6,820,814 B1 * | 11/2004 | Benoit | ......................... | 235/487 |
| 2001/0002486 A1 * | 5/2001 | Kocher et al. | .............. | 713/171 |
| 2001/0053220 A1 * | 12/2001 | Kocher et al. | ................ | 380/29 |

OTHER PUBLICATIONS

Chari et al, "Towards Sound Approaches to Counteract Power-Analysis Attacks", Aug. 1999, Crypto '99, p. 398-412.*
Kocker et al, "Differential Power Analysis", Cryptography Research, Inc., p. 1-10.*

(Continued)

*Primary Examiner*—Christopher Revak
(74) *Attorney, Agent, or Firm*—Louis P. Herzberg

(57) ABSTRACT

Methods, apparatus and computer software and hardware products providing method, apparatus and system solutions for implementing table lookups in a side-channel attack resistant manner. Embodiments are provided for devices and situations where there is limited amount of RAM memory available or restrictions on memory addressing. The solutions solve problems associated with look up tables with large indices, as well as problems associated with looking up large sized tables or a collection of tables of large cumulative size, in limited devices, in an efficient side-channel attack resistant manner. These solutions provide defenses against both first-order side channel attacks as well as higher-order side channel attacks. One aspect of the present invention is the creation of one or more random tables which are used possibly in conjunction with other tables to perform a table lookup. This denies an adversary information about the table lookup from the side channel and thereby imparting side-channel resistance to the table lookup operation. Another aspect of the present invention is the use of a combination of some operations such as Table Split, Table Mask and Table Aggregate, to achieve this side-channel resistance within the limited amounts of available RAM and limited memory addressing capabilities of the device performing table lookups.

56 Claims, 15 Drawing Sheets

OTHER PUBLICATIONS

U.S. Appl. No. 09/240,503, filed Jan. 29, 1999, entitled, "Method And Device For Securely handling Information In A Cryptographic Information Processing System".

Chari et al., Towards Sound Approaches To Counteract Power-Analysis Attacks.

* cited by examiner

SPACE-EFFICIENT, SIDE-CHANNEL ATTACK RESISTANT TABLE LOOKUPS

PRIORITY

This application claims priority to Provisional application entitled, "A Technique for Space-Efficient, Side-Channel Attack Resistant Table Lookups", filed, Aug. 14, 2001, assigned Ser. No. 60/312,204.

CROSS REFERENCE

This application is cross-referenced to U.S. patent application, entitled, "METHOD AND DEVICE FOR SECURELY HANDLING INFORMATION IN A CRYPTOGRAPHIC INFORMATION PROCESSING SYSTEM," assigned Ser. No. 09/240,503, filed Jan. 29, 1999, now abandoned, which is incorporated herein by reference in entirety for all purposes.

FIELD OF INVENTION

This invention relates to the field of information security. More particularly, it relates to processing of sensitive data.

BACKGROUND OF THE INVENTION

The field of information security deals with methods and mechanisms to protect sensitive information. Some of these methods and mechanisms deal with the problem of maintaining the integrity of information while it is in storage or in transit, others deals with the issue of ensuring that the information is available only to authorized entities and access is denied to entities not so authorized. Several of the methods and mechanisms used in the field of information security are based on the use of Cryptographic Algorithms. Table lookup is a fundamental primitive used by many cryptographic algorithms such as the Data Encryption Standard (DES), Advanced Encryption Standard (AES), the popular A3/A8 algorithm used in GSM cell-phones which is known as COMP128 etc. Table lookups are also used by some non-cryptographic algorithms in the field of information security. For example, universal hash functions are traditionally not considered to be cryptographic algorithms although they are used for ensuring the integrity of information and some universal hash functions are based on table lookups. Thus, Table lookup is an important primitive used in the field of information security.

In its simplest form, a Table is a collection of data values wherein each of said data values in said collection has a distinct index. The Table lookup operation then comprises of obtaining the data value that corresponds to a supplied index. The total amount of memory needed to store a Table, that is, to store the entire collection of data values is referred to as the lookup table size. In addition, the total number of distinct indices in the collection, which by definition is the number of data values in the collection, is referred to as the table lookup index size. For any given table T, hereinafter, we shall use the notation T[i] to refer to the data value that corresponds to the index i. Thus although the present application is described in terms of tables and table lookup operations it includes all means of representing collections of data such as arrays, matrices, ordered sets, lists, groups, collections etc.

Implementing the Table lookup primitive in situations where information security is not an issue is usually straightforward. In fact, Table lookup is such a basic primitive that many general purpose computing platforms have specialized hardware to assist in this operation, for example many microprocessors have an indexed addressing mode where one supplies the location of a table in the memory of a computing system and an index into the table and the hardware retrieves the data value corresponding to the index.

However, in situations where information security is an issue, implementing a Table lookup is substantially harder. This is because this operation has to be performed on some information processing equipment which is a physical system. The Table lookup operation that has to be performed could involve information which is sensitive in nature and disclosure of this information or part thereof to unauthorized entities must be prevented. For example, the index being accessed in the Table lookup operation and/or the data value corresponding to the index could be sensitive. All physical information processing systems leak information about their internal states into the physical environment in which they are placed. Such leakage occurs in a variety of ways. For example, the instantaneous power consumption of a system conveys information about the operations being carried out by the device at that time, the timing of certain operations conveys information about the operations, the electromagnetic emissions from a device carry information about the operations being done on the device, etc. In the field of information security it is customary to call these additional sources of information as Side-Channels. It is well known that information security can be seriously compromised if Side-Channel information is available to unauthorized entities. In fact, there is a large class of attacks, known in the literature, in which an unauthorized entity gets sensitive information by exploiting side-channel information, some examples being Timing attacks (TA), Simple Power Analysis attacks (SPA), Differential Power Analysis attacks (DPA), Simple Electromagnetic Analysis attacks (SEMA), Differential Electromagnetic Analysis attacks (DEMA), higher-order DPA, higher-order DEMA etc. Hereinafter we will use the generic term side-channel attacks to include all attacks which involve analysis of any side-channel. This term includes TA, SPA, DPA SEMA, DEMA etc. We use the generic term, higher-order side-channel attacks, to include all attacks which involve the analysis of multiple side-channels or multiple sections the same side-channel or both. This generic term includes higher-order DPA, higher-order DEMA etc. Therefore, if a Table lookup involving sensitive information is to be performed within a physical system then special care must be taken to limit the information leakage from various Side-Channels in the scenario where an unauthorized entity can have access to these Side-Channels. This makes the implementation of a Table lookup much more complex in this scenario. In addition, implementing Table lookup on resource constrained information processing devices such as chip cards, cryptographic tokens etc., poses a special challenge since these devices are less shielded from the environment and therefore have larger leakage of information via various side-channels. In general, it is reasonable to assume that in performing a table lookup the information obtained via the side channel is statistically related to each bit of the index being addressed and to each bit of the data value corresponding to the index.

Many mechanisms and countermeasures are known in prior art, have been proposed to reduce the effectiveness of side-channel exposures in constrained information processing devices. These fall into two main categories. In the first category are physical protection methods which try to reduce the amount of information leakage from the device itself, e.g., the use of physical shielding and techniques for hardware design which minimize the leakage of information. Use of these techniques result in devices which inherently leak less information on the side-channels than devices which are not thus protected. However, the leakage is not entirely eliminated. In most situations, even after the application of these physical protections, there is enough information leakage so that implementations of information security techniques on such devices can be attacked using statistical side-channel attacks such as DPA, DEMA, higher-order DPA, higher-order DEMA etc. To overcome this problem, there is another category of protection mechanisms which are based on reducing the effectiveness of the information that does leak on the side-channels. These type of protections require a careful implementation of information security techniques on the device, where the implementation is quite different from the obvious and direct implementations of the technique. Most of these latter protection mechanisms are either based on or similar to a generic method and technique outlined in, "Towards Sound Approaches to Counteract Power Analysis Attacks," authored by Suresh Chari, Charanjit S. Jutla, Josyula R. Rao and Pankaj Rohatgi, which appears in proceedings of "Advances in Cryptology-CRYPTO '99", Lecture Notes in Computer Science, # 1666, published by Springer, Pages 398–412, which is incorporated herein by reference in entirety for all purposes. The present invention can be viewed as a substantial improvement to the table lookup scheme suggested in that publication. Since the present invention of a space-efficient, side-channel attack resistant table lookup mechanism would be part of a larger side-channel attack resistant implementation of any information security technique which involves table lookups as well as other operations, we now describe the generic method and technique, hereinafter referred to as the "General Countermeasure Against Side-channel Attacks" which is disclosed in the aforementioned publication. The next few paragraph is an adaptation from the original paper which described the technique and is therefore put in quotes.

"A General Countermeasure

A General Countermeasure Against Side-Channel Attacks is to ensure that the adversary cannot predict any relevant bit of information from the side-channel in any clock cycle, without making run-specific assumptions independent of the actual inputs to a computation. This makes statistical tests involving several experiments impossible, since the chance of the adversary making the correct assumptions for each run is extremely low. While this yields secure computation, it is not clear how one can do effective computation under this requirement since no bit depending directly on the data and key can be manipulated at any cycle. In some cases the function being computed has algebraic properties that permits such an approach, e.g., for RSA one could use the well known blinding technique to partially hide the actual values being manipulated. Another class of problems where this is possible is the class of random self-reducible problems. Such structure is unlikely to be present in primitives such as block ciphers."

"Encoding

The encoding we propose is to randomly split every bit of the original computation, into k shares where each share is equiprobably distributed and every proper subset of (k−1) shares is statistically independent of the encoded bit. Computation can then be carried securely by performing computation only the shares, without ever reconstructing the original bit. Shares are refreshed after every operation involving them to prevent information leakage to the adversary."

"To fix a concrete encoding scheme, we assume that each {\em bit} is split into k shares using any scheme which has the required stochastic properties. For instance, bit b can be encoded as the k shares $b \oplus r_1, r_2, \ldots, r_{k-1}, r_1 \oplus \ldots \oplus r_{k-1}$, where the $r_i$'s are randomly chosen bits. Furthermore, assume that each share is placed in a separate word at a particular bit position and all other bits of the share word are chosen uniformly at random."

"in practice, it would be more useful, if each word of computation is split similarly into k shares. In that case, other schemes of splitting into shares based on addition mod 256, subtraction mod 256 would also be viable. Encoding bytes of data manipulated by splitting them into shares would yield the optimal performance. Ignoring the initial setup time, the performance penalty in performing computation using just the k shares is a factor of k. Our results which have been proved based on the bit encoding scheme would also work for this case but the bounds they yield are based only on the characteristics of the noise within the chip, and hence may not be optimal. This is discussed briefly after the analysis for the bit encoding case. The results and analysis we present here can serve as a framework in which to prove results for the byte encoding scheme."

"The method to encode the bit in secret shares should be chosen based on the computation being protected. For instance, for an implementation of DES, the XOR scheme is ideal since the basic operations used are XOR, permutations, and table lookups. Table lookups can be handled by first generating a random rearrangement of the original table since a randomized index will be used to look up the table. This step increases the overhead beyond the factor of 2."

"In practice, the splitting technique needs to be applied only for a sufficient number of steps into the computation until the adversary has very low probability of predicting bits, i.e., till sufficient secret key dependent operations have been carried out. Similar splitting also has to be done at end of the computation if the adversary can get access to its output. For instance, in DES, one needs to use the splitting scheme only for the first four and last four rounds."

Thus, the above publication provides a general countermeasure against side-channel attacks, which is to split each bit or word of the computation into k shares (where k is any integer such as 2, 3, 4, . . . , etc.) with specific statistical properties. Hereinafter we will refer to any such mechanism to split any bit or word in a computation to be a "secret-sharing operation". Thus the countermeasure for any information security techniques will work by splitting all inputs into shares using a secret-sharing operation, performing computation on the shares to obtain shares of the output and then recombining the shares of the output using the inverse of secret-sharing operation to produce the output. However, the mechanism proposed to deal with Table lookups, which is to create a random rearrangement of the original table (which has to be in RAM) is inefficient, since the random rearrangement of a table in RAM will take as much space as the size of the table. Thus in prior art, reducing the exposures from side-channels during table lookups has been the most challenging since many good countermeasures require much more Read/Write memory (such as RAM) than these devices can spare. Further, the limited addressing capabilities of such devices often complicates lookups of large tables, sometimes leading to new side-channel exposures. For example, many smart cards have a total of only 256–512 bytes of RAM. A significant part of this memory is required for the regular functioning of these smart cards and therefore only a fraction of this total RAM can be made available for countermeasures against side channel leakage. In many scenarios, the amount of RAM available for countermeasures, which is hereinafter referred to as available RAM is significantly less than the lookup table size. For example the COMP 128 algorithm requires lookup of a table of size 512 bytes and index size of 512 and several other smaller tables, and the DES algorithm requires the lookup of eight tables of size 64 bytes and index size 64 each for a total of 256 bytes. Many chip cards have no more than 256 bytes of RAM and the available RAM is even smaller and this means that good known countermeasures cannot be applied to such cards to protect against side channel attacks for algorithms such as DES, COMP 128 etc. In addition many smart cards are 8-bit machines and can lookup indices only within the range 0 to 255, within a table of bytes at any one time. This leads to problems if the smart card is required to access a table of bytes with larger index size than 256. For example, the COMP 128 table with 512 byte table size and index size of 512 cannot be looked up in a single operation on such a chip card and any such operation has to be implemented as a sequence of operations. Having a sequence of operations to implement a Table lookup opens up additional avenues for attack using side-channels. As a result of these limitations, heretofore side-channel attack resistant implementations many algorithms which utilized the Table lookup operation required the use of more expensive devices which had more RAM, or these implementations were either unacceptably slow or are still susceptible to side channel attacks.

The terms set and subset as used herein is used as in mathematics. Thus, a set refers to a collection of elements. A subset of a set refers to another collection of zero or more elements from said set including the total set.

SUMMARY OF THE INVENTION

In a first aspect this patent provides methods and apparatus to create efficient side channel attack resistant implementation of table lookups. This generally results in use of less RAM than the size of the table being accessed. In addition, in many embodiments of the present invention, the invention solves problems related to information leakage when accessing tables having large indices.

An additional aspect of the presentation is provision of a substantial improvement of other approaches which provided resistance against side-channel attacks using as much RAM as the size of the table being accessed by exploiting tradeoffs between RAM usage and additional accesses to ROM. This tradeoff is advantageous in applications where the cost of requiring extra access to ROM is significantly less than the cost of including additional RAM resources into the device.

Another aspect of the invention is that the RAM usage and ROM access tradeoff is achievable in a manner that preserves the resistance of the implementation to side channel vulnerabilities.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

Figure 1:
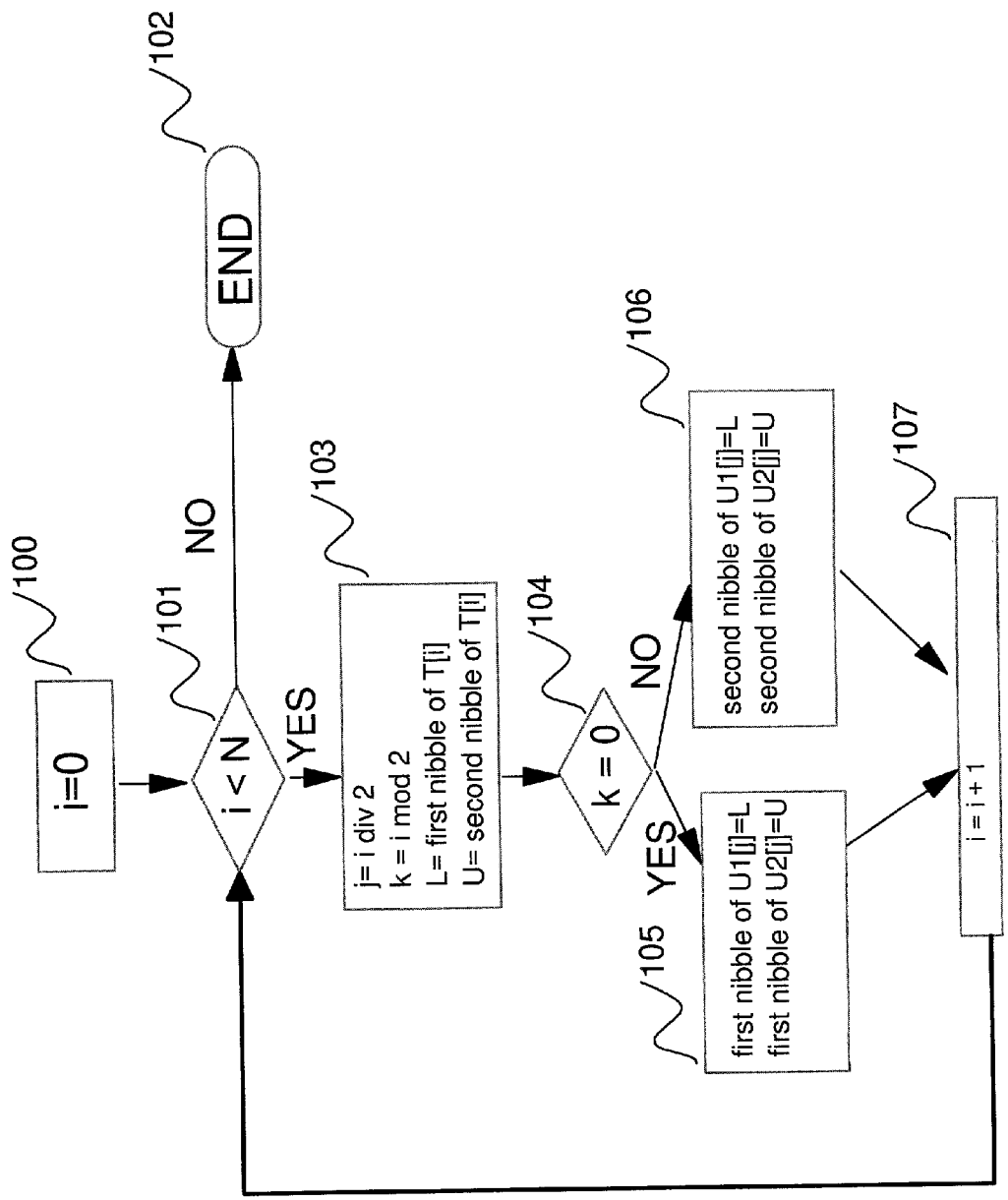
FIG. 1, shows an example of a flow chart of a process by which N byte table T is split into the two tables U1 and U2 of size N/2 bytes each using the Two-way Byte Table Splitting Method.

This patent provides ways to create an efficient side channel attack resistant implementation of table lookups using much less RAM than the size of the table being accessed. In addition, in many cases this solution also takes care of the problem of dealing with tables having index size which is too large to be lookup up in a single operation.

One of the problems being solved by this invention is the following: An information processing operation needs to be performed involving lookups of at least one known lookup table. Each particular table from said at least one known lookup table having a particular lookup table size and a particular lookup table index size. There is a certain amount of available RAM for this operation and the operation needs to be implemented efficiently within the available amount of RAM in a manner which resists side-channel attacks. In mathematical notation, therefore we have p known lookup tables T1, T2, T3, ..., Tp for some integer p>0 and we have M bytes of available RAM.

The invention is best taught in terms of the application of three building blocks, the Table Split operation, the Table Mask operation and the Table Aggregate operation which are described herein.

The "Table Split" Operation:

This operation is used for a known table T if there is too little RAM to hold the entire table T or the index requirements of T are more than the addressing abilities of the device implementing the table lookup. That is, the particular table T has particular lookup table size more than M bytes or the particular table T has particular lookup table index size which exceeds the maximum index the device can use to address a table in memory.

Let n be the number of bits required to represent any possible index of the lookup table T. Let b be the number of bits required to represent any possible data value in the lookup table T. Hereinafter we will refer to any such T as a n-bit to b-bit table.

The n-bit to b-bit table T is to be then split into a collection of k split tables U1, U2, ..., Uk such that each split table has smaller table size and/or smaller table index size than T. Furthermore, any lookup into the table T and be accomplished by a sequence of lookups into these split tables U1, ..., Uk. Table splitting can be accomplished in a variety of ways as known to those skilled in the art becoming familiar with the spirit and concepts presented herein.

For the purposes of exposition, first a simple method herein referred to as "Two-way Byte Table Splitting Method", is described which splits a n-bit to 8-bit table T into two (n−1)bit to 8 bit tables U1 and U2 and it is shown how U1 and U2 can be used in place of T, for the purpose of table lookup. Subsequently a more general method is herein referred to as the "Output Divisor Table Splitting Method" is described which splits a n-bit to b-bit table T into m equal sized tables U1, ... Um where m is any divisor of b and it is shown how U1, ..., Um can be used in place of T. The methods described herein result in split tables all having equal size. This is because in many applications it is advantageous to have split tables be of equal size. We will also describe at a higher level how the table could be split unequally. Therefore, even though the detailed descriptions provided herein produce split tables of equal size, those with ordinary skill in the art can easily apply the methods described herein and obvious variants thereof to create tables which are of unequal size and in that sense this invention also covers the case where the split tables are of unequal size.

First, a simple splitting scheme is described for a Two-way Byte Table Splitting Method, that splits a n-bit by 8-bit table T of table size N bytes into two (n−1)-bit by 8-bit tables U1 and U2 of size N/2 bytes each and uses U1 and U2 instead of T for the purposes of table lookup. Essentially U1 contains the compacted form of the first nibbles of the data values of T and U2contains the compacted form of the second nibbles of T. The full details of one method of performing this split is illustrated in FIG. 1 which provides a flow chart of a process which splits T into the two tables U1 and U2. Since the table T is of size N bytes and the data values are each of size 1 byte, without loss of generality, assume the index runs from 0 through N−1. The process starts (100) by setting a loop variable "i" to the value of 0. A process of splitting the data value of T having the i'th index is then performed in a loop for each value of "i" from 0 to N−1. The loop for the variable "i" is realized using a comparison step (101) and an increment step (107). In the comparison step, it is verified that the value of "i" is less than N and if not the process is terminated (102) or else the processing continues on with step (103). The increment step (107) increments the value of "i" by 1 and then jumps to the comparison step. For each valid value of "i", the following is performed. First, variables "j", "k", "L" and "U" are set based on the current value of "i" and T[i] (103). The variable "j" is set to "(i div 2)" which is the largest integer less than or equal to (i/2). The variable "k" is set to "(i mod 2)", the parity of "i". The variable "L" is set to the first nibble (least significant 4-bits) of the byte T[i]. The variable "U" is set to the second nibble (most significant 4-bits) of the byte T[i]. Then in step (104) the parity variable "k" is compared to 0. If "k" equals 0, then step (105) is performed else step (106) is performed. In step (105) the first nibbles of the j'th data value of U1 and U2 are set to the values "L" and "U" respectively that were computed in step (103) and then step (107) is performed. In step (106), the second nibbles of the j'th data value of U1 and U2 are set to the values "L" and "U" respectively that were computed in step (103) and then step (107) is performed.

Figure 2:
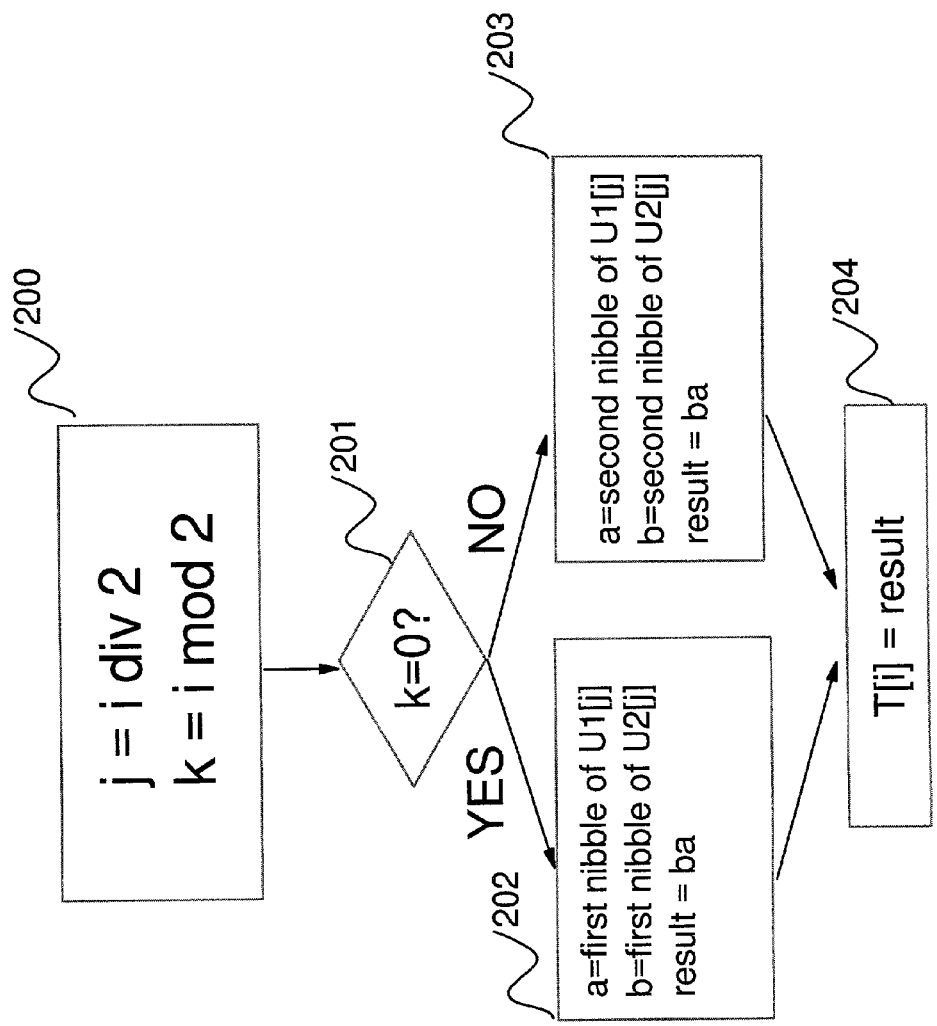
FIG. 2, shows an example of a process to lookup T[i] when T has been split into tables U1 and U2 using the Two-way Byte Table Splitting Method.

This completes a detailed description of implementation employing a Two-way Byte Table Splitting Method in which U1 and U2 are derived from T. In order to use these split tables in place of T, the process of obtaining T[i] from U1 and U2 is now described. Briefly, since U1contains the compacted form of the first nibbles of data values of T and U2 contains the second nibbles, the lookup of the value T[i] is done using U1 and U2 by locating the first nibble of T[i] in U1 and the second nibble of T[i] in U2 and combining these two nibbles. FIG. 2 provides detailed flowchart of a process to lookup T[i] when T has been split into tables U1 and U2 using the two-way Byte Table Splitting Method. As a first step (200) variables "j" and "k" are set based on the value of i. The variable "j" is set to be the largest integer less than or equal to i/2 and "k" is set to be (i mod 2), that is the parity of i. Then a decision is made depending on the value of the parity (201). If the parity is even, that is "k" equals 0, then step (202) is performed else step (203) is performed. In step (202) the variable "a" is set to be the first nibble of U1[j] and the variable "b" is set to be the first nibble of U2[j]. Then a byte sized variable called "result" is computed by setting the first nibble of "result" as "a" and the second nibble of "result" as "b". By the way the tables U1 and U2 are created, the value of "result" will be the same as the value T[i] and thus the value of T[i] can be assumed to be equal to that of "result" (204). In case step (203) is performed ( instead of (202) ), then the variable "a" is set to be the second nibble of U1[j] and the variable "b" is set to be the second nibble of U2[j]. Then a byte sized variable called "result" is computed by setting the first nibble of "result" as "a" and the second nibble of "result" as "b". By the way the tables U1 and U2 are created, the value of "result" will be the same as the value T[i] and thus the value of T[i] can be assumed to be equal to that of "result" (204).

Figure 3:
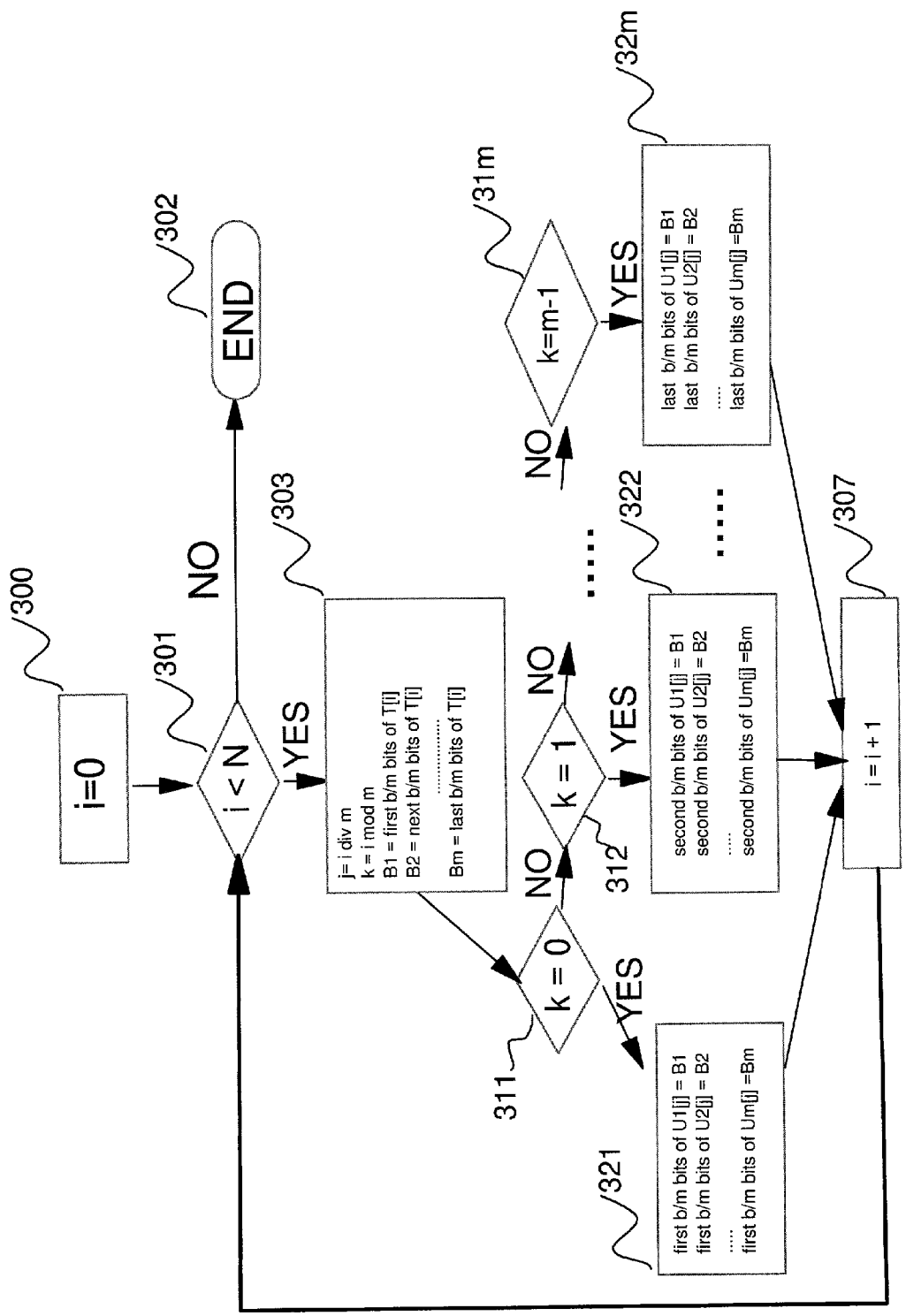
FIG. 3, shows an example of a flow chart of a process to split a N byte table T into m tables U1, U2 . . . Um of size N/m bytes each using the Output Divisor Table Splitting Method.

This completes the detailed description of the Two-way Byte Table Splitting Method which splits a n-bit by 8-bit table T of table size N bytes into two (n−1)-bit by 8-bit tables U1 and U2 of size N/2 bytes each and uses U1 and U2 instead of T for the purposes of table lookup. Next a more general scheme herein referred to as the "Output Divisor Table Splitting Method" is described which splits a n-bit to b-bit table T into m equal sized tables U1, . . . Um where m is any divisor of b and it is shown how U1, . . . , Um are used in place of T. Essentially each U1 contains, in compacted form, the bits ((b/m)*i) through ((b/m)*(i+1)−1) of the data values of T. In this respect, the Two-way Byte Splitting Method scheme can be viewed as a special case of this scheme with m=2 and b=8. The full details of one method of performing this split is illustrated in FIG. 3 which provides a flow chart of a process which splits the N byte table T into m tables U1, U2 . . . Um of size N/m bytes each using the Output Divisor Table Splitting Method. Since the table T is of size N bytes and the data values are each of size 1 byte, without loss of generality, assume the index runs from 0 through N−1. The process starts (300) by setting a loop variable "i" to the value of 0. A process of splitting the data value of T having the i'th index is then performed in a loop for each value of "i" from 0 to N−1. The loop for the variable "i" is realized using a comparison step (301) and an increment step (307). In the comparison step, it is verified that the value of "i" is less than N and if not the process is terminated (302) or else the processing continues on with step (303). The increment step (307) increments the value of "i" by 1 and then jumps to the comparison step. For each valid value of "i", the following is performed. First variables "j", "k", "B1", . . . , "Bm" are set based on the current value of "i" and the value of T[i] (303). The variable "j" is set to (i div m) which is the largest integer less than or equal to (i/m). The variable "k" is set to (i mod m). The variables "B1", . . . , "Bm" are set as follows: "B1" is set to be the first set of (b/m) bits of T[i]; "B2" is set to the second set of (b/m) bits of T[i] (the next least significant (b/m) bits) and so on and finally "Bm" is set to be the last (b/m) bits of T[i] (the most significant (b/m) bits). Then in step (311) the variable "k" is compared to 0. If "k" equals 0, then step (321) is performed else in step (312) the variable "k" is compared to 1 and if equal then step (322) is performed and so on till one by one all possible values of "k" which range from 0 to m−1 are exhausted. Finally if "k" happens to be "m−1", this check is performed in step (31m) and step (32m) is performed. Thus one of steps (321), (322) . . . , (32m) is performed based on the value of "k". In step (321) the first (b/m) bits of U1[j], . . . , Um[j ] are set to the values "B1", . . . , "Bm" respectively, which were computed earlier in step (303). In step (322) the second (b/m) bits of U1[j], . . . , Um[j] are set to the values "B1", . . . , "Bm" respectively, which were computed earlier in step (303) and so on, and in step (32m) the last (b/m) bits of U1[j], . . . , Um[j] are set to the values "B1", . . . , "Bm" respectively, which were computed earlier in step (303). Any one of steps (321), (322) . . . , (32m) is followed by step (307).

Figure 4:
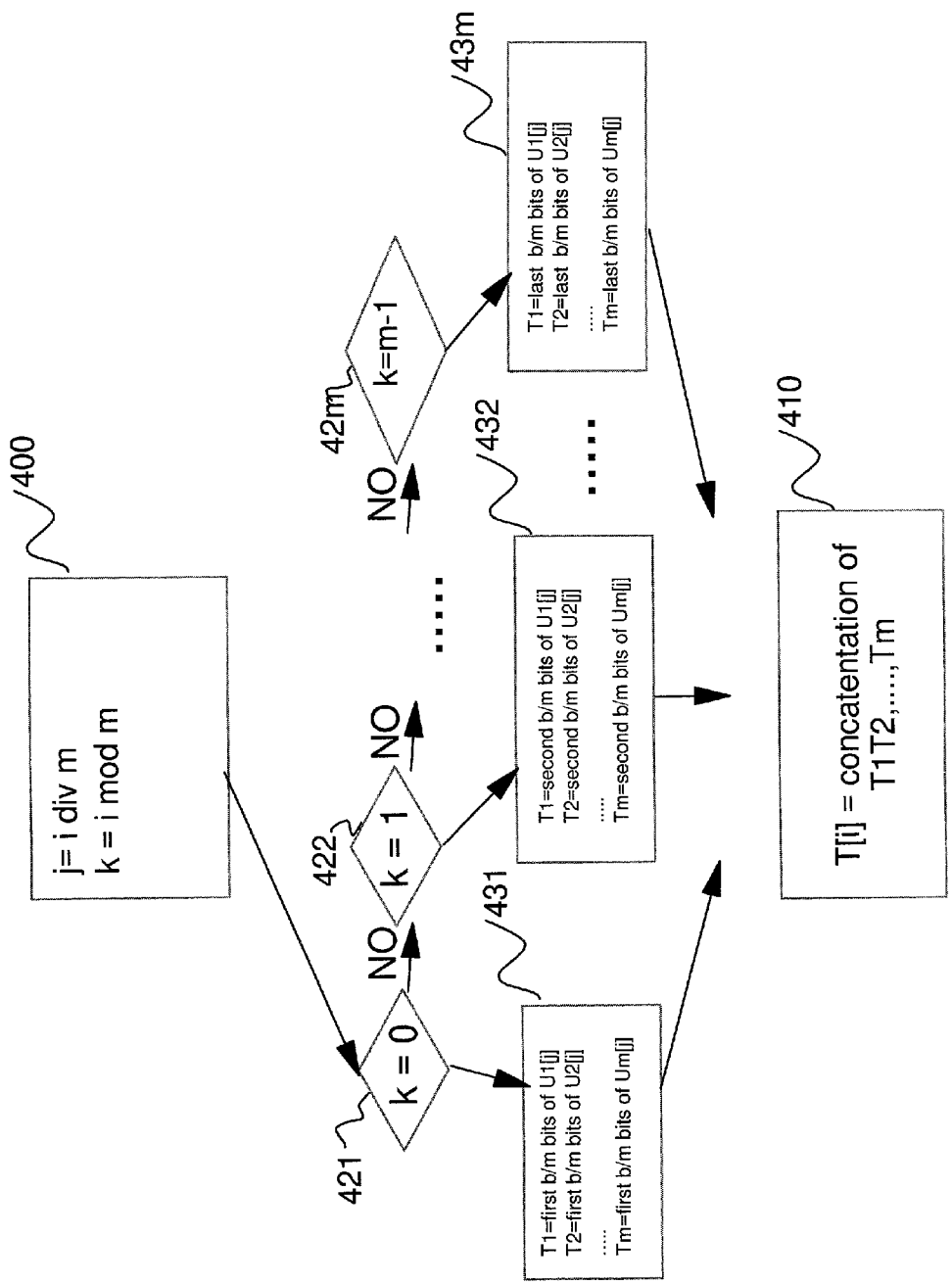
FIG. 4, shows an example of a process to lookup T[i] when T has been split into m tables U1, U2, . . . , Um using the Output Divisor Table Splitting Method.

This completes a detailed description of how U1, U2, . . . , Um are derived from T using the Output Divisor Table Splitting Method. In order to use these split tables in place of T, the process of obtaining T[i] from U1, . . . , Um is now described. Briefly, since U1 contains the compacted form of the first (b/m) bits of data values of T and U2 contains the second (b/m) bits and so on and Um contains the last (b/m) bits, the lookup of the value T[i] is done using U1, . . . , U, m by locating the first (b/m) bits of T[i] in U1 and the (b/m) bits of T[i] in U2 and so on and the last (b/m) bits in Um and combining these bits. FIG. 4 provides detailed flowchart of a process to lookup T[i] when T has been split into tables U1, . . . , Um according to the Output Divisor Table Splitting Method. As a first step (400) variables "j" and "k" are set based on the value of i. The variable "j" is set to be the largest integer less than or equal to i/m and "k" is set to be (i mod m). Then a decision is made depending on the value of the "k". This decision is made by having the value of "k" compared with all possible values it can take, i.e., 0 to m−1 in steps (421), (422), . . . , (42m) respectively. Based on the success of this comparison exactly one of steps (431), (432), . . . , (43m) is taken where a success in comparison (421) leads to step (431) and so on and finally a success in comparison (42m) leads to step (43m). Steps (431), (432), . . . , (43m) of which only one is performed are quite similar. In step (431) variables "T1", . . . , "Tm" are set to be the first (b/m) bits of U1[j], . . . ,Um[j] respectively. In step (432) the variables "T1" , . . . , "Tm"are set to be the second (b/m) bits of U1[j], . . . , Um[j] respectively and so on and in step (43m) the variables "T1", . . . , "Tm" are set to be the last (b/m) bits of U1[j], . . . , Um[j] respective. After performing any one of the steps (431), (432), . . . , (43m), step (410) is performed which computes the value of T[i] to be the concatenation of the first (b/m) bits from each of the variables "T1", . . . , "Tm".

Whereas the above descriptions showed how to create and use split tables of equal size, it is easy to modify these constructions to produce tables of unequal size. In an example embodiment, the "Unequal Table Split Method" is used in which the lookup table T is split into k tables T1, . . . , Tk wherein each table Ti is a compacted table containing information only about bi bits of the data values of T, and where the bi's (for i=1 to k) sum up to b and are not all equal. This results in tables T1, . . . , Tk being of different sizes.

Those with ordinary skill in the art will recognize that the methods presented herein are most advantageous when the index size of the table being split can be represented by a power of 2. However it is noted that the concepts of the present invention are applicable to any index size. Indeed even the examples presented herein are not limited to tables with index sizes represented by a power of 2.

The Table Mask Operation

The table mask operation takes a known or split table n-bit to b-bit T and creates a masked table T' in RAM having the same table size with the property that it is feasible to perform the table lookup operation of T using only T'. The table T' has a randomness property in that each data entry in it is statistically independent of any of the entries T. In addition if a table lookup operation of a particular index of T being performed using only T' then the index or indices looked up in T are statistically independent of the said particular index of T. The Table Mask operation provides a strong defense against side-channel attacks. This is because if an implementation directly looks up the known table T, then the side-channel will correlate to each bit of the table index accessed and to each bit of the value of the table entry at that index. This fact can be exploited by an attacker who knows T. However, if T' is used instead of T then the side channel will correlate to the bits of the index and data accessed in T' which is random and statistically independent of T and thus provides no useful information to the attacker. Implementation of the Table mask can be accomplished in a variety of ways known to those skilled in the art becoming familiar with the spirit and concepts presented herein.

One advantageous way to perform table lookup, is herein referred to as the "Input-Output Permutation Masking" method. The Input-Output Permutation Masking method is done as follows:

In what follows, without loss of generality assume that the indices in T has N distinct indices which vary from 0 to N−1.

Let IP (index permutation) be a class of n-bit to n-bit permutations with the property that for any n-bit value i, if a permutation ip is chosen uniformly at random from the class IP, then the value ip(i) is statistically independent of i.

Let OP (output permutation) be a class of b-bit to b-bit permutations with the property that for any b-bit value o, if a permutation op is chosen uniformly at random from the class OP, then the value op(o) is statistically independent of o.

For each instance of a operation needing one or multiple lookups of a table T, a fresh random looking "masked" table T' is computed and placed in RAM. This is done as follows:

Choose a permutations ip∈IP uniformly at random from that class.

Choose a permutation op∈OP uniformly at random from that class.

Define the masked table T' as follows.

For all indices i of the table T, i<=0<N, T'[ip(i)]=op(T[i]).

The table lookups thus works with masked values of the index (ip(i) instead of i) and result in masked values of the output. By working throughout with appropriately masked values, one can perform the entire algorithm without ever exposing any intermediate result in the clear and preventing a side-channel attack. Working with masked values is a well known mechanism to avoid side-channel attacks and has been extensively described in the literature. For example, this is shown in, S. Chari, C. Jutla, J. R. Rao, P. Rohatgi, "Towards Sound Approaches to Counteract Power-Analysis Attacks", CRYPTO '99 Conference, LNCS 1666, August 1999, CHANGE TO AS DISCUSSED IN BACKGROUND.

To further illustrate the Table Mask operation we provide a general flowchart of how T' is obtained from T and how lookups of T is performed using only T' based using the Input-Output Permutation Masking Method. Later another Table Masking method herein referred to as the "Input-Output XOR Permutation Masking Method" will be described in detail. This is similar to the Input-Output Permutation Masking Method but instead of using general permutation, XOR based permutations are used. That method will also be used in an advantageous embodiment.

Figure 5:
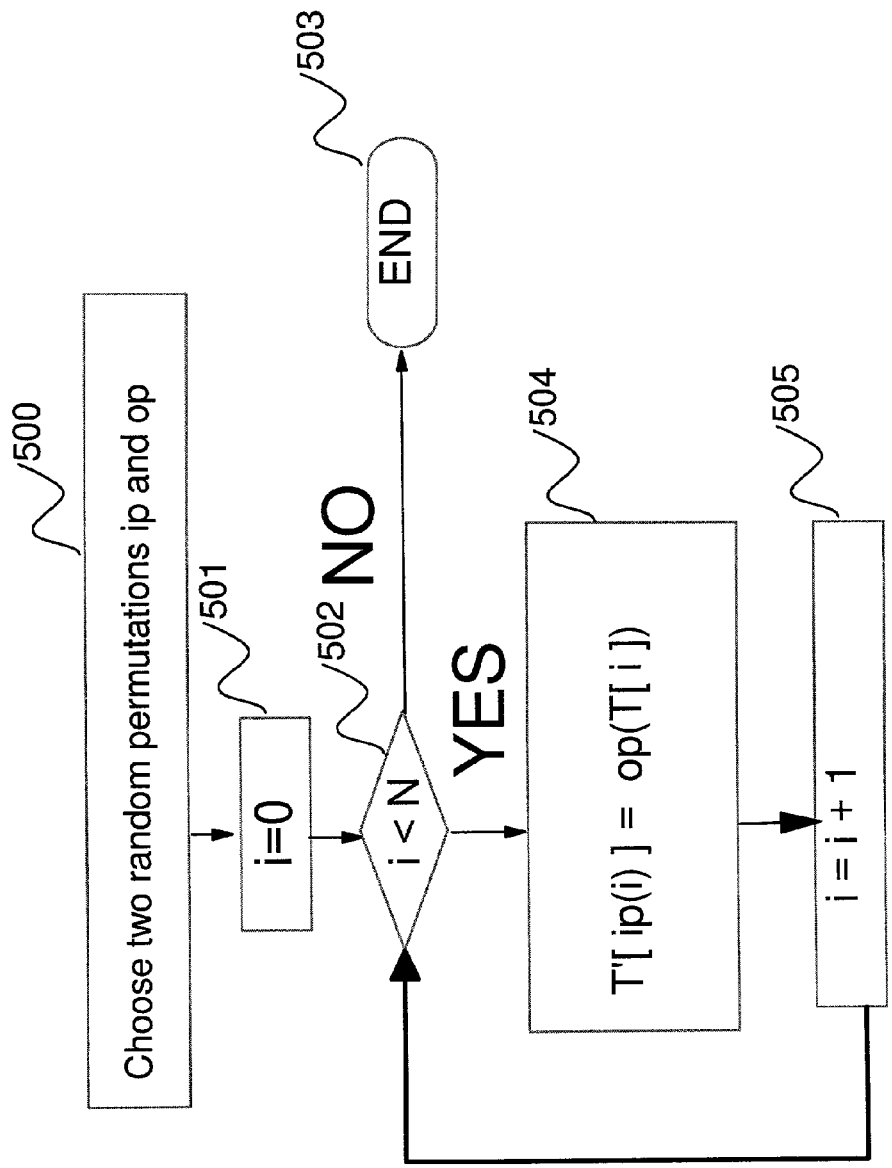
FIG. 5, shows an example of a flow chart for the Table Mask operation using the Input-Output Permutation Masking Method.

FIG. 5 shows a flow chart for computing T' from T using the Table Mask operation based on the Input-Output Permutation Masking Method. As a first step (500) two random permutations "ip" and "op" are chosen uniformly at random from the sets IP and OP respectively. In the next step (501), a loop variable "i" is set to 0. Labels (502), (503) and (505) show how this flowchart implements a loop where the variable "i" varies from 0 to N−1. Step (502) is a comparator which checks that (i<N) and if so continues processing at step (504) otherwise it stops the processing (503). After the processing step (504) the loop variable "i" is incremented at step (505) and control is transferred again to the loop range check (502). The main processing for each "i" in the range is done in step (504), where T'[ip(i)] is set to op(T[i]). This completes the description of the flowchart to compute T' from T.

Figure 6:
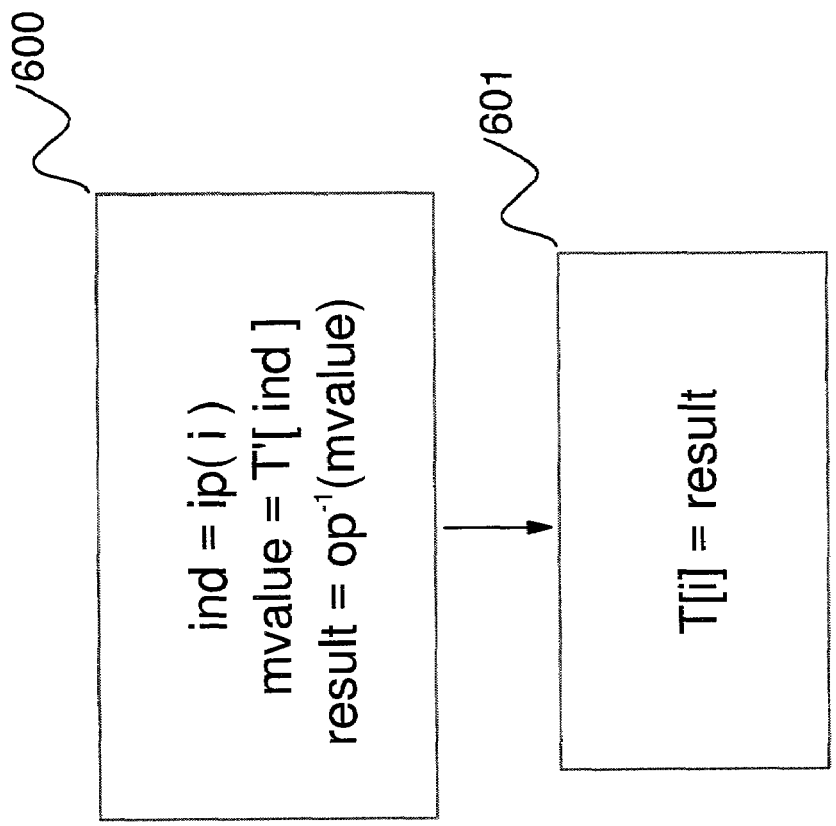
FIG. 6, shows an example of a process to lookup T[i] when table T has been masked using the Input-Output Permutation Masking Method.

FIG. 6 shows a flow chart for using the table T' created in FIG. 5 using the Input-Output Permutation Masking Method for performing table lookups in table T. Suppose it is desired to lookup T[i] using T'. A first step (600) is to compute a variable "ind" to be ip(i). The variable "mvalue" is then obtained by looking up T' at index of "ind". The variable "result" is set to the inverse permutation of "op" (that is $op^{-1}$) applied to "mvalue". The value of T[i] is the same as "result" (601). It should be noted here that the table T' is looked up at a random permutation of the index i and the value which is looked up is a random permutation of the value of T[i]. This means that both the index and value looked up in T' is statistically independent of i and T[i] respectively.

Figure 7:
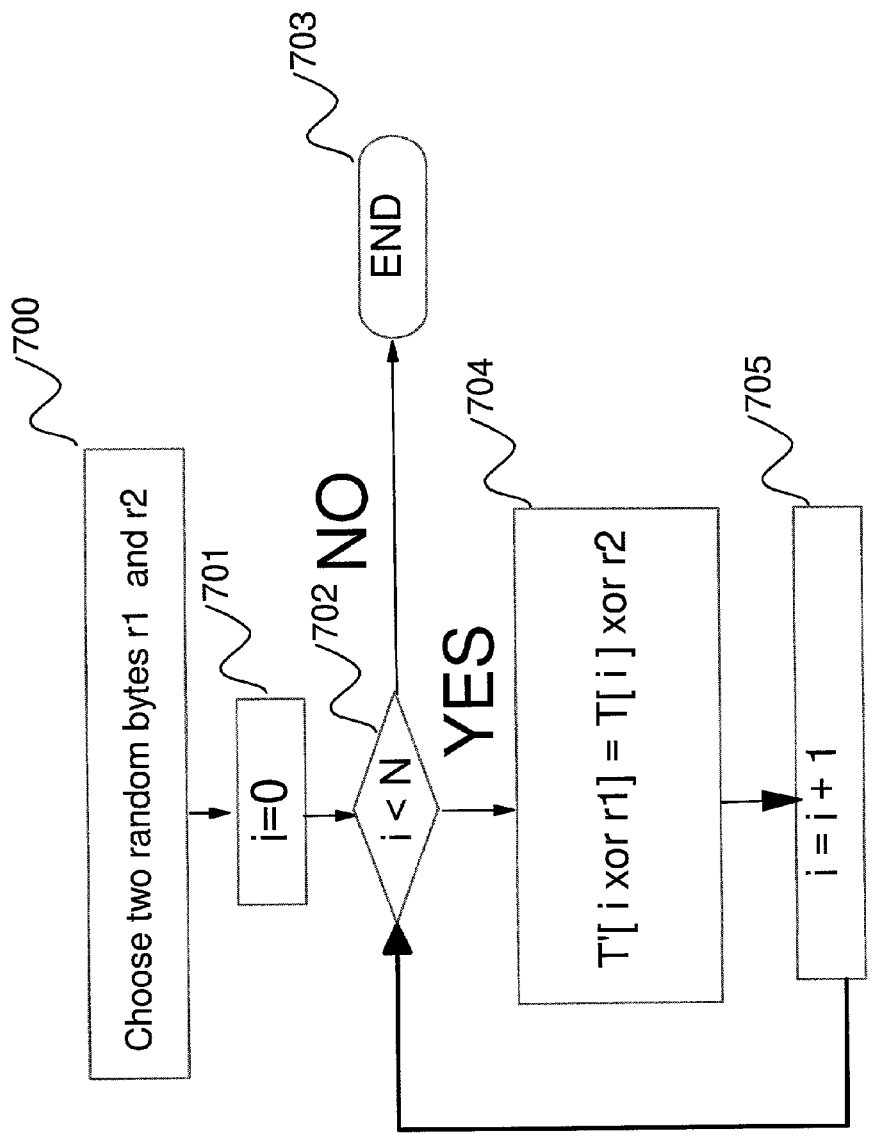
FIG. 7, shows an example of a flow chart for the Table Mask operation using the Input-Output XOR Permutation Masking Method.

In some scenarios it is advantageous to use simple XOR based permutations for IP and OP. This is the motivation for the Input-Output XOR Permutation Masking Method. Choosing a n-bit to n-bit XOR permutations (such as "ip") consists of choosing a single n-bit random number "r1" and the XOR permutation "ip" defined by "r1", just XORs its input with "r1". Similarly choosing a b-bit to b-bit XOR based permutation for "op" consists of choosing a single b-bit random number "r2". FIG. 7 gives a flowchart for computing T' from T using the Table Mask operation based on the Input-Output XOR Permutation Masking Method. As a first step (700) a random XOR index permutation is chosen by choosing a random n-bit number "r1" and a random XOR output permutation is chosen by choosing a random b-bit number "r2". In the next step (701), a loop variable "i" is set to 0. Labels (702), (703) and (705) show how this flowchart implements the loop where the variable "i" varies from 0 to N−1. Step (702) is a comparator which checks that (i<N) and if so continues processing at step (704) otherwise it stops the processing (703). After the processing step (704) the loop variable "i" is incremented by 1 at step (705) and control is transferred again to the loop range check (702). The main processing for each "i" in the range is done in step (704), where T'[i xor r1] is set to (T[i] xor r2). This completes the description of the flowchart to compute T' from T.

Figure 8:
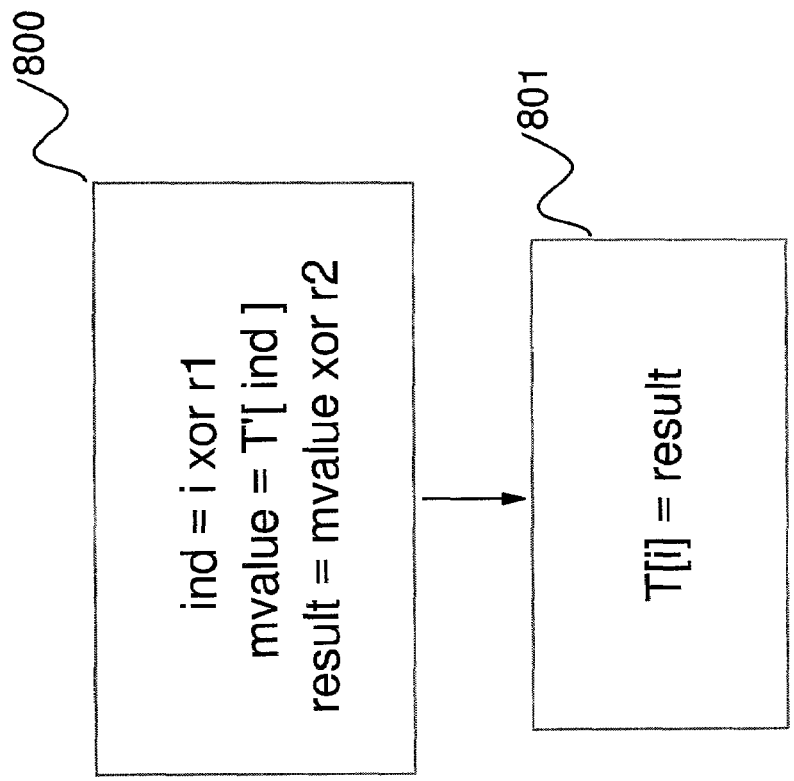
FIG. 8, shows an example of a process to lookup T[i] when table T has been masked with using the Input-Output XOR Permutation Masking Method.

FIG. 8 shows a flow chart for using the table T' created in FIG. 7 using the Input-Output XOR Permutation Masking Method for performing table lookups in table T. Suppose it is desired to lookup T[i] using T'. A first step (800) is to compute a variable "ind" to be (i xor r1). The variable "mvalue" is then obtained by looking up T' at index of "ind". The variable "result" is set to (mvalue xor r2). The value of T[i] is the same as "result" (801).

Problems with Table Mask

The main problem with the "Table Mask" building block described above is that it needs table T' to be in RAM and the size of T' is the same as that of T. In many cases such a large amount of RAM may not be available. Additionally, if many such tables have to be examined multiple times within the algorithm, then for efficiency purposes, masked versions of all of them should be simultaneously kept in RAM. Also, if n is large, then it may not be possible to easily index directly into T' (or T for that matter) and the index space would have to be split into multiple tables, opening up an avenue for attacks since the attacker may be able to discern which of the multiple tables was accessed which in turn gives information about the supposedly secret value of the index.

The solution to all these problems, is to use the Table Mask operation in conjunction with the two other operations, the Table Split operation which we described earlier and the Table Aggregate operation which we describe below. The Table Split operation takes care of large table sizes or tables with large index sizes. The Table Mask operation provides defense against side-channel attacks but requires as much RAM as the Table or Tables being accessed. In embodiments where there is enough available RAM and there is no problem of large table index, just a Table Mask operation suffices. In embodiments where there is enough available RAM but at least one Table has a problem of large index size, a combination of Table Split and Table Mask is usually enough to provide side-channel resistance. However, where available RAM is less than the combined sizes of the Tables to be protected, then either a combination of Table Mask operations and Table Aggregate operations is performed or a combination of all three operations, Table Split, Table Mask and Table Aggregate is performed.

The Table Aggregate Operation

Suppose we have m, tables V1, V2, . . . , Vm each of size no more than M bytes. The Table Aggregate operation combines the given tables V1, V2, . . . , Vm to create an aggregate table W of size no more than M bytes with the property that given W and all but one of the tables Vi, it is feasible to recover the table Vi. The combination of the given tables to create the aggregate table, i.e., the Table Aggregate operation can be accomplished in a variety of ways as known to those skilled in the art becoming familiar with the spirit and concepts presented herein. In one advantageous embodiment, hereinafter referred to as the "Entry-wise Algebraic Aggregate Method", the Table Aggregate operation is accomplished by combining corresponding data entries of the tables V1, . . . , Vm using an algebraic operation to create an entries of the aggregate table W. Depending on the types of data values in the tables V1, . . . , Vm, there can be a variety of algebraic operators as known to those skilled in the art. Examples include the xor operation, the modular addition operator, the modular subtraction operation, etc. This embodiment is particularly suitable if data entries of all tables are of similar size. An example of application of the Entry-wise Algebraic Aggregate Method is given in FIG. 9 where data values from m tables V1, . . . , Vm having same index size N are combined to form a single table W having an index size of N using some algebraic operation "opn". As a first step (900) a loop variable "i" is set to 0. Labels (901), (902) and (904) show how this flowchart implements the loop where the variable "i" varies from 0 to N−1. Step (901) is a comparator which checks that (i<N) and if so continues processing at step (903) otherwise it stops the processing (902). After the processing step (903) the loop variable "i" is incremented at step (904) and control is transferred again to the loop range check (901). The main processing for each "i" in the range is done in step (903), where the i'th data value of W, that is W[i], is set to be the algebraic operation "opn" applied to the i'th data values of V1, . . . , Vm, i.e., V1[i], V2[i], . . . , Vm[i]. This completes the description of the flowchart to compute W from V1, . . . , Vm.

Figure 9:
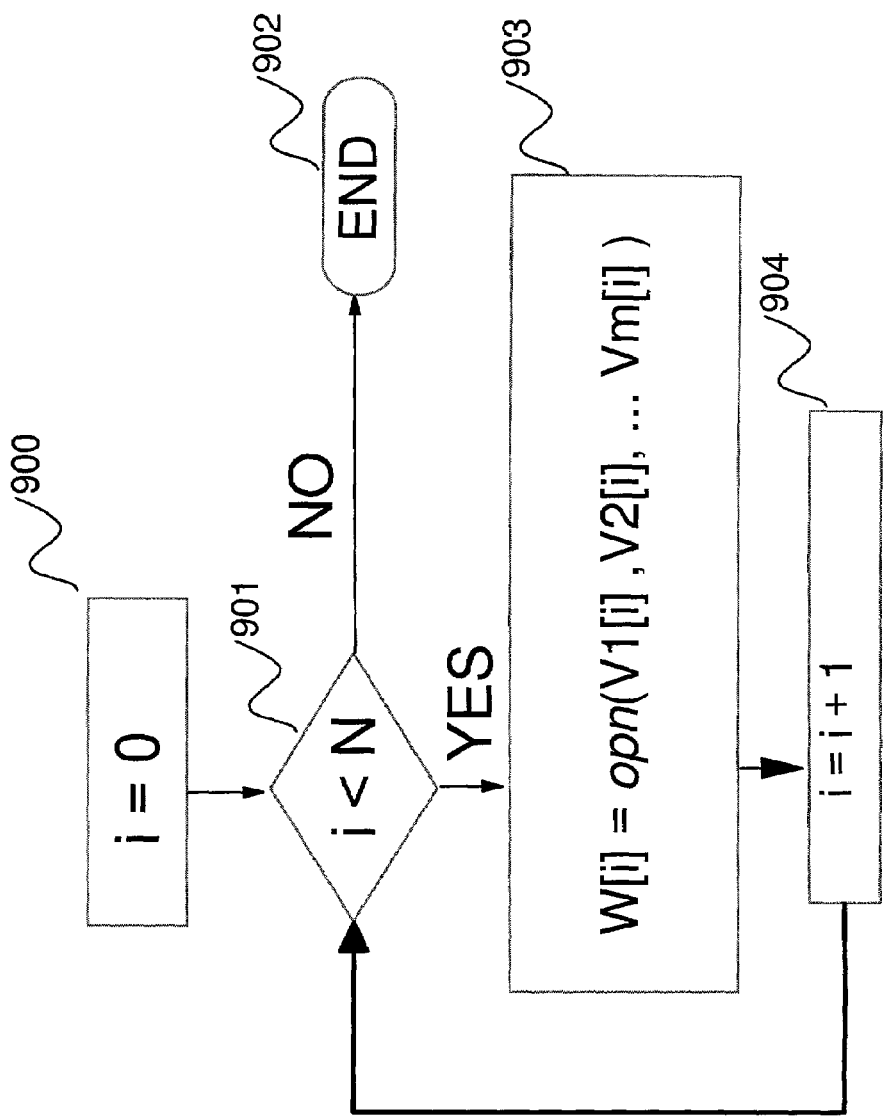
FIG. 9, shows an example of a process which combines data values from m tables V1, . . . , Vm having same index size N to form a single table W having an index size of N using the Entry-wise Algebraic Aggregate method based on the algebraic operator "opn"
Figure 10:
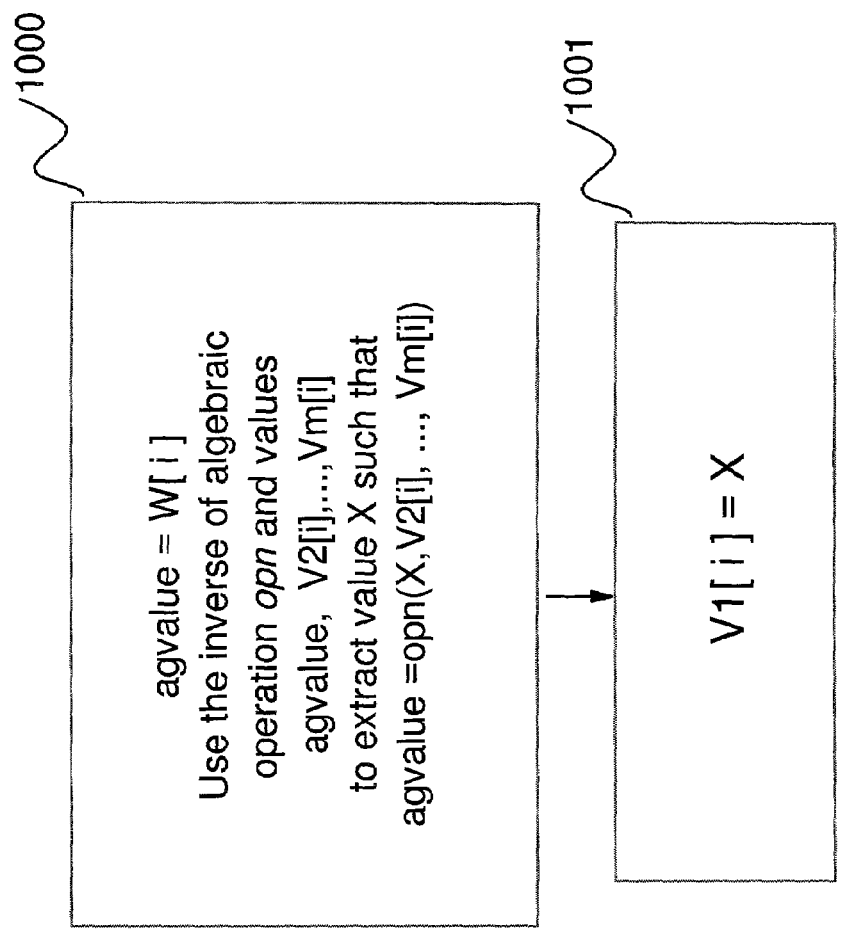
FIG. 10, shows an example of a process which recovers the data value V1[i] from the table W and tables V2, . . . , Vm, where W was created as shown in FIG. 9 from V1, . . . , Vm using the Entry-wise Algebraic Aggregate method.

FIG. 10 shows how one can use the aggregate table W constructed in FIG. 9 to look up an entry in any of the tables V1, . . . , Vm, for example the entry V1[i], from W and the other tables , i.e., how to look up the entry V1[i] using only the tables W, V2, . . . , Vm. In step (1000) first the a variable "agvalue" is set to W[i], i.e., the aggregated value in W at index i. Then the values of V2[i], . . . , Vm[i] which were used in the aggregation operation in FIG. 9 are looked up. Clearly, the value of the variable "agvalue" was obtained by applying the algebraic operation "opn" to the values V1[i], . . . , Vm[i] in Step (903) of FIG. 9. Therefore by using the inverse of the algebraic operation "opn", a unique value for a variable "X" is determined such that (agvalue=opn(X, V2[i], . . . , Vm[i])). The value of "X" must be the value of V1[i] (1001).

In another advantageous embodiment, hereinafter referred to as the "Byte-wise XOR Aggregate Method" ,W is created by padding with extra 0's all tables V1, . . . , Vm to size M bytes and then doing a byte-wise XOR of the corresponding bytes in all the m padded tables. Clearly, a table Vi can be recovered from W and V1, . . . ,Vi−1, Vi+1, . . . Vm by XORing all these tables. Another embodiment uses byte-wise addition modulo 256 instead of XOR. The main advantage of using the byte-wise XOR or addition modulo 256 operation to create the aggregate table W is that, if the tables V1, . . . , Vm are created one or a few bytes at a time, then the table W is created using only slightly more than M bytes of memory.

Figure 11:
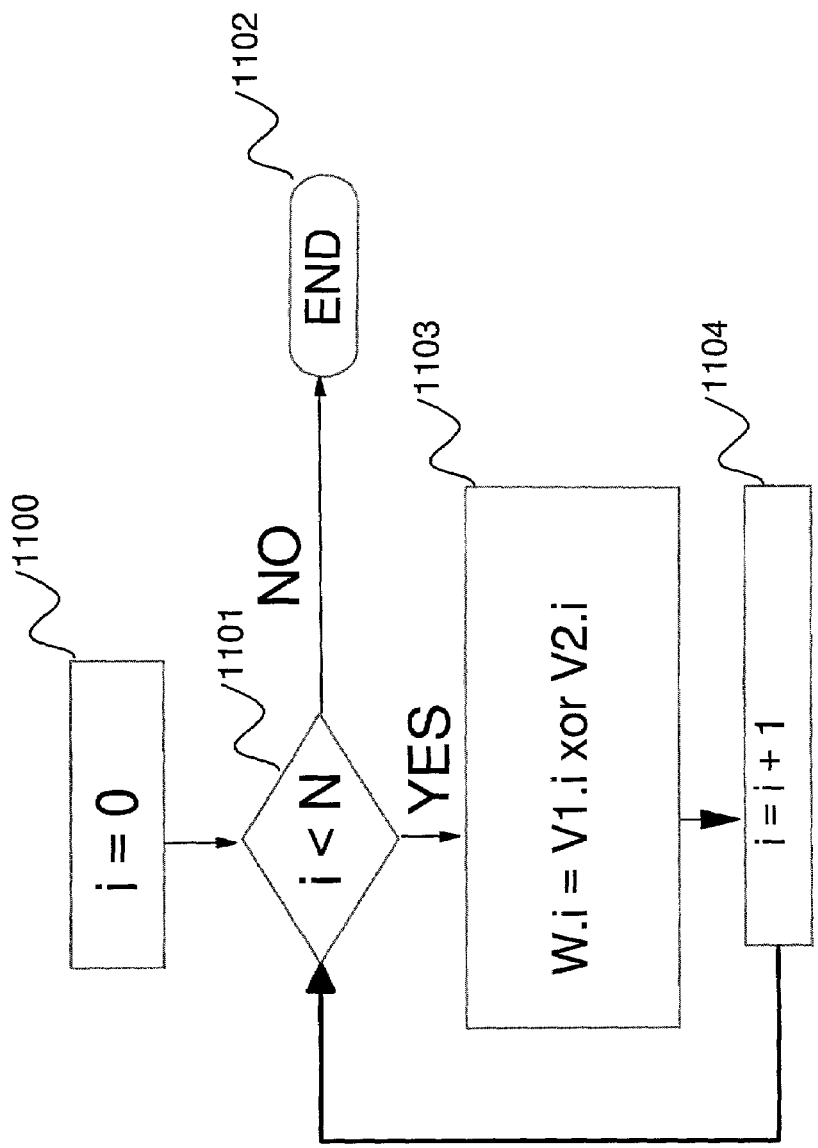
FIG. 11, shows an example of a process which combines data values from 2 tables V1, V2 having same index size N to form a single table W having an index size of N using the Byte-wise XOR Aggregate Method.

As a further example, FIG. 11 shows the process which combines data values from 2 tables V1, V2 having of size N bytes to form a single table W of size N bytes using the Byte-wise XOR Aggregate Method. In the following descriptions, the notation T.i will be used to denote the i'th byte of a Table T.

As a first step (1100) a loop variable i is set to 0. Labels (1101), (1102) and (1104) show how this flowchart implements the loop where the variable i varies from 0 to N−1. Step (1101) is a comparator which checks that i<N and if so continues processing at step (1103) otherwise it stops the processing (1102). After the processing step (1103) the loop variable i is incremented at step (1104) and control is transferred again to the loop range check (1101). The main processing for each i in the range is done in step (1103), where the i'th byte e of W, that is W.i is set to be V1.i XOR V2.i. This completes the description of the flowchart to compute W from V1, V2.

Figure 12:
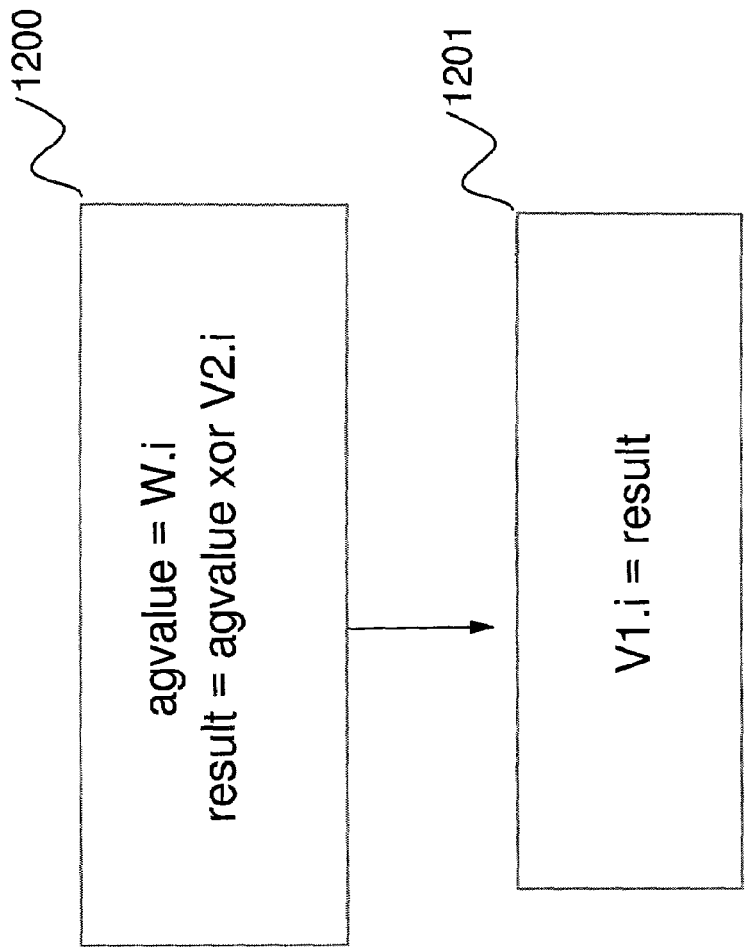
FIG. 12, shows an example of a process which recovers the data value V1[i] from the table W and table V2 in created in FIG. 11 using the Byte-wise XOR Aggregate Method.

FIG. 12 shows the Process which recovers the byte V1.i from the table W built in FIG. 11 using the Byte-wise XOR Aggregate method and the table V2. In step (1200) the variable "agvalue" is set to the aggregated byte value W.i. Then a variable "result" is computed as is ( agvalue XOR V2.i ). Clearly, since the value of "agvalue" was obtained by computing V1.i XOR V2.i in the construction of W, the value of the variable "result" must be the value of V1.i (1201).

This completes the description of the building blocks. Next, a method of using these building blocks to solve the problem of side-channel attacks on table lookups is described.

Suppose there are M bytes of available RAM to spare for table lookup on a device and a restriction on the memory addressing mechanism which limits any index to be no more than n-bits. Suppose there is at least one and potentially several known tables to be looked up in a side-channel attack resistant manner. The present invention solves this problem by using a combination of some of the building blocks Table Split, Table Mask and Table Aggregate described earlier. Since the Table Mask operation provides primary defense against side-channel attacks, it is used in most embodiments whereas the use of the operations Table Split and Table Aggregate is not necessary in some embodiments, As a first step the Table split operation is applied on all known tables whose lookup needs to be protected against side-channel attacks and whose table size is more than M and/or whose index size exceed the memory addressing mechanism. If there is no such known table then the Table split operation is not necessary. Applying the Table Split operation on any known table yields a collection of split tables whose table size is less than M and whose index size is within the n-bit limit As described earlier in the description of the Table Split operation and also in FIGS. 2 and 4, any access to any of the known tables which have been split can be substituted by appropriate accesses to the corresponding collection of split tables. Thus the implementation of table lookups is rewritten using these split tables. If these split tables were to be kept in ROM the implementation would be vulnerable to side channel attacks.

To take care of the side-channel attacks, in the next stage, the Table Mask operation is conceptually applied on all the split tables and also the remaining known tables that were not split to create a collection of masked tables. As described earlier, the masked tables have a randomness property, in that data values and corresponding indices to the masked tables are statistically independent of the data values and corresponding indices of the tables upon which the Table Mask operation is performed. As described in detail in the section on Table mask operation and further described in FIGS. 6 and 8, all access to the known or split tables that have been masked can be replaced by accesses to these masked tables.

If all the masked tables together require no more than M bytes of RAM, then a side-channel attack resistant implementation within the constraints has already been obtained. In several embodiments, however, the total size of all masked tables still exceeds the limit M on available RAM, since it was only required that each individual table that is masked be of size no more than M (otherwise it would have been split) and if there are several such tables, collectively the masked tables could require more RAM than M, since each masked table uses as much RAM as the size of the table that was masked. To take care of this problem, the Table aggregate operation is "conceptually applied" on some groups of the masked tables so that no more than M bytes of RAM are consumed by the Aggregate tables thus produced or by the remaining masked tables not involved in any Aggregate operation. It should be noted that the randomness property of the masked tables is also maintained by the aggregated tables.

In practice, in embodiments where Table Aggregate is needed, the implementation may not even be able to actually create the full masked tables, since this could take much more RAM than is available. That is why it is stated that the Table Mask operation is "conceptually applied". In embodiments where is not possible to create the full masked tables due to available RAM constrains, the implementation would create one or a few bytes of these masked tables at a time and update the Aggregate table being computed. That is why, both in the description of the process to compute Table Mask, the data entries in the masked table are computed one at a time and in the description of the Table Aggregate, operation each data entry of the Aggregate table depends on one or at most a few of the data entries from each of the tables being aggregated. Using this approach the RAM usage would mostly be the M bytes needed to store the Aggregate tables and other masked tables not involved in an Aggregate operation. All known and/or split tables which were used for the Table Mask operation are put in ROM and all the tables in RAM, whether they be masked tables or Aggregate tables are hereinafter referred to as random tables.

Figure 13:
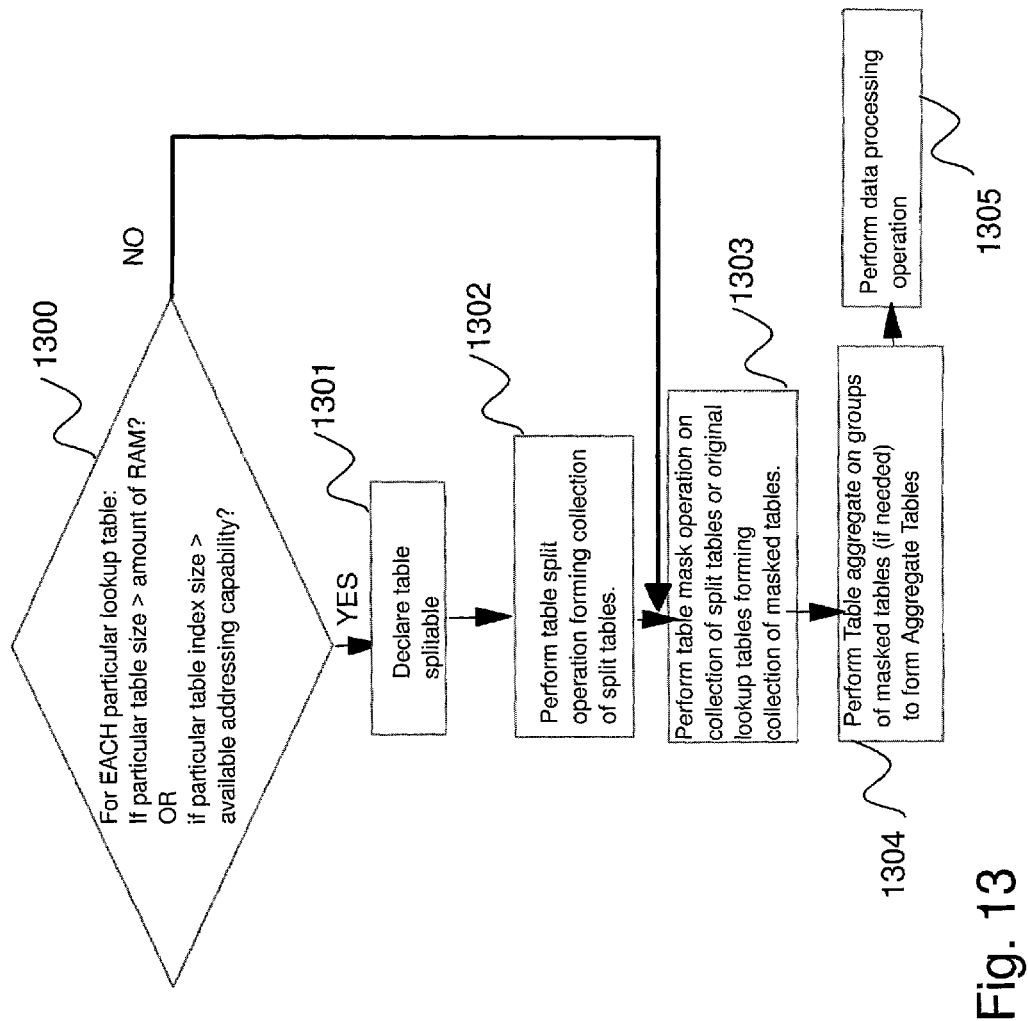
FIG. 13, shows an example of a summary of a process to set up the infrastructure to perform table lookups of one or more known lookup tables, each of these known lookup tables having a particular table size and a particular table index size, in a side-channel attack resistant manner with the constraints of M bytes of available RAM and a limit on addressing capability.

With this infrastructure in place any data processing operation that required table lookup of any of the known tables can be implemented in a side-channel attack resistant manner using only the available RAM and memory addressing limits. FIG. 13 summarizes this process to set up the infrastructure to be able to perform table lookups of one or more known lookup tables, each of these known lookup tables having a particular table size and a particular table index size, in a side-channel attack resistant manner with the constraints of M bytes of available RAM and a limit on addressing capability. For each particular known table first a check is made as to whether its particular table size is more than M OR its particular table index size is more than the addressing capability (1300). If this check passes this particular table needs to be split, it is declared splittable in step (1301). Otherwise, this particular table goes to the table mask stage (1303). If a particular table is declared splittable in step (1301) then this table is split into a collection of split tables in step (1302) and these split tables are then sent to the table mask stage (1303). At stage (1303) all tables whether they are split tables or known tables are masked using the Table Mask operation to yield a collection of masked tables, where each of these masked tables has a randomness property. As described earlier, in practice this masking operation may only be done conceptually, i.e., done in conjunction with the table aggregate operation (1304). Some groups of masked tables are aggregated in step (1304) if needed, e.g., all masked tables cannot fit in available RAM to yield a collection of Aggregate Tables in RAM. With the collection of known and split tables (tables which were masked) in ROM and the Aggregate and remaining masked tables in RAM, i.e., a collection of random tables, any data processing operation which required any lookup of any of the known tables can be performed in a side-channel resistant manner. This completes the summary presented in FIG. 13.

Now we provide additional details as to how the infrastructure consisting of the known and split tables that were masked being in ROM and the aggregate and remaining masked tables in RAM are used to any perform data processing operation which requires a lookup of any of the known tables. Suppose an index I into a particular known table P needs to be looked up in a side-channel resistant manner. If the known table was split during setup, then the problem can be solved if several indices can be looked up into split tables as described the description of the Table Split operation and in particular FIGS. 2 and 4. Since all the split tables and all the known tables that were not split were masked, the problem of looking up P[I] can be solved if any index in any table that was involved in the masking step can be looked up. Note that in the setup, all the split tables and the tables which were not split are in ROM, but these cannot be directly used since the direct access will open up side-channel exposures. To get side-channel resistance the random tables, i.e., the masked or aggregate tables in RAM, which are random and statistically independent of the known and split tables will have to be used. So the problem reduces to that of accessing any index L in any of the table R which is in ROM using the masked tables or the aggregate tables instead of the ROM table. In the case where R which is in ROM needs to be accessed and the R', masked version of the table R, is available as a random table in RAM, the problem is solved as shown in the description of the Table Mask operation and in particular FIGS. 6 and 8. Essentially the problem is reduced to looking up an entry T of R' which can be done directly if R' is available. In the case where R' has been aggregated into an aggregate table W then the description of the Table Aggregate operation and in particular FIGS. 10 and 12 show that the problem obtaining R'[T] from the aggregate table W reduces to the problem of lookup of an Aggregate table entry (which is done directly) and looking up certain entries and one or more other masked tables, V'1, . . . , V'm. Since the unmasked versions of all these masked tables say T1, . . . , Tm are in ROM, using the description of the Table Mask operation, specifically FIGS. 5 and 7 which shows how masked tables are generated, one can obtain the values of entries in V'1, . . . , V'm using DIRECT accesses to tables T1, . . . , Tm in ROM. Since the data values and indices in tables V'1, . . . , V'm are generated to be statistically independent of the values and indices in tables R' or R or T1, . . . , Tk, this DIRECT access to T1, . . . , Tk leaks no information on the side-channel since the indices accessed and data values obtained are statistically independent of R and L. Thus the problem of obtaining R'[T] from the aggregate table in a side-channel resistant manner is solved which in turn solves the problem of obtaining R[L] which in turn solves the original problem obtaining P[I] in a side channel resistant manner.

Figure 14:
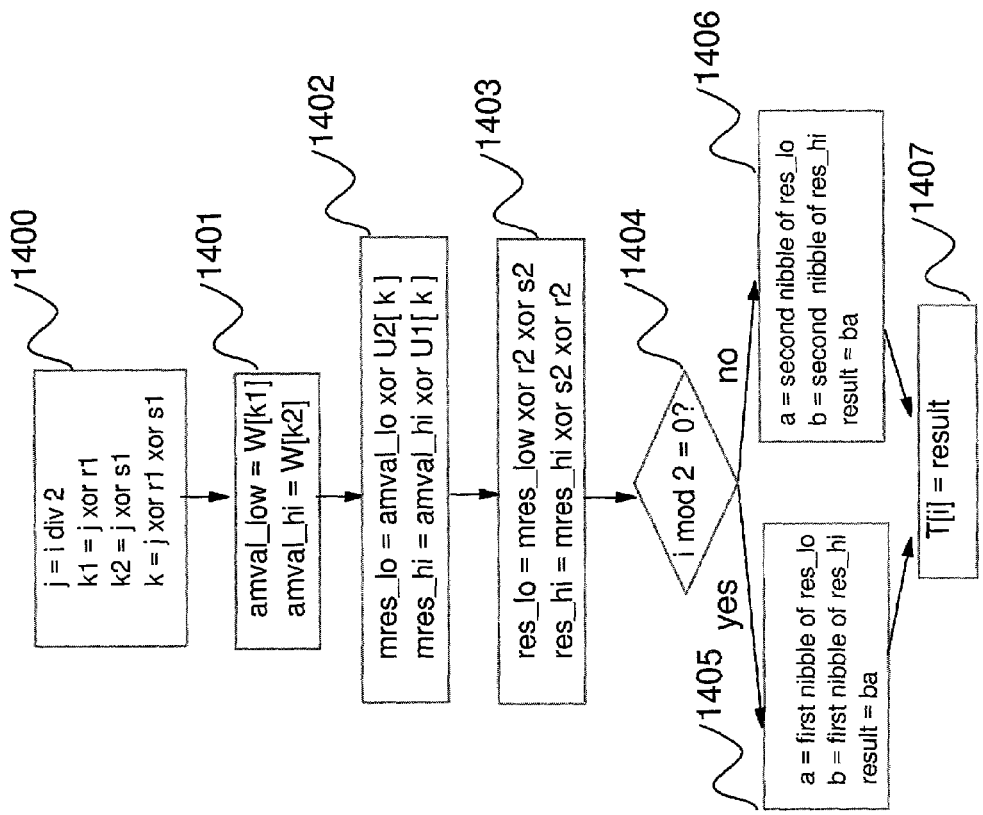
FIG. 14, shows an example of a process of looking up the data value T[i] in a known table T, when T has been first split into table U1 and U2 using the Two-way Byte Table Splitting Method, U1 and U2 have been masked to produce tables U1' and U2' using the Input-Output XOR Permutation Masking method and masked with r1, r2 and s1, s2 respectively, and U1' and U2' then aggregated into a an aggregate table W using the Byte-wise XOR Aggregate Method. W is in RAM and U1, U2 are in ROM.

For illustrative purposes we now describe an example of this process of using the infrastructure to build and to do a known table lookup operation. In the example, a n-bit to 8-bit lookup Table T with index size $2^n$ and table size $2^n$ has to be implemented on a device with available memory of roughly $2^n/2$ bytes and an memory accessing mechanism which restricts index sizes to be $2^n/2$. The infrastructure to do this is straightforward using this invention. First the Two-way Byte Table Splitting method is directly applied to T, as shown in FIG. 1 and described in detail earlier. This yields two n–1 bit by 8-bit split tables U1 and U2, each of size $2^n/2$ bytes and index size $2^n/2$. Then the process of Table masking is "conceptually applied" to the tables U1 and U2 to conceptually yield the tables U1' and U2'. U1' and U2' are the same size as U1 and U2. In each case, the Input-Output XOR Permutation Masking Method is used for the Table Mask operation as shown in FIG. 7. Let r1 and r2 be the index and output XOR masks used for the masking operation that yielded U1' from U1 and let s1 and s2 be the index and output XOR masks used for the masking operation that yielded U2' from U2. In practice U1' and U2' are not actually computed completely, but are computed byte by byte and used to compute an aggregate table W using the Byte-wise XOR Aggregate method as described earlier and as shown in FIG. 11. The table W, which is of size $2^n/2$ and index $2^n/2$ is kept in RAM and the tables U1 and U2 are kept in ROM. This completes the description of how the random table W and the split tables U1 and U2 are set up. Next the mechanism to access any entry of T, say T[i] in a side-channel attack resistant manner is described. This process is also illustrated in FIG. 14. As explained in the description of the Two-way Byte Table Splitting Operation and further illustrated in FIG. 2 in step (201) and in steps (202) or (203), computing T[i] requires access to the bytes U1[j] and U2[j] where the variable "j" is (i div 2). Now as explained in the description of the Input-Output XOR Permutation Method and further illustrated in FIG. 8, step (800) computing U1[j] needs access to U1'[j xor r1]. Similarly computing U2[j] needs access to U2'[j xor s1]. Since U1' and U2' are not available and only the aggregate table W is available, as explained in the description of the Byte-wise XOR Aggregate method, obtaining U1'[j xor r1], needs access to W[j xor r1] as shown in FIG. 12, step (1200) and obtaining U2'[j xor s1] needs access to W[j xor s1]. Since W is available this step can be performed directly. However, according to step (1200), obtaining U1'[j xor r1] from W [j xor r1] also needs access to U2'[j xor r1] and obtaining U2'[j xor s1] from W[j xor s1] also needs access to U1'[j xor s1] and the tables U1' and U2' are not available in ROM or RAM. However, the tables U1 and U2 from which U1' and U2' were derived in the Table mask operation are in ROM. Therefore by repeating the steps used to create entries in U1' and U2' using U1 and U2 based on the Input-Output XOR Permutation Method as illustrated in FIG. 7, the values U2'[j xor r1] and U1'[j xor s1] can be obtained. For example, as explained in the description of the Input-Output XOR Permutation Method and in FIG. 7 step (704), for any i, the data value (U1'[i xor r1]) is (U1[i]xor r2). Thus, the value U1'[j xor s1] which is the same as U1'[(j xor s1 xor r1) xor r1] must be the same as U1[j xor s1 xor r1)] xor r2. Thus the value U1'[j xor s1] is obtained by an access to U1[j xor s1 xor r1] and similarly the value of U2'[j xor r1] is obtained by an access to U2[j xor r1 xor s1]. Based on the description presented above, FIG. 14 describes the steps needed to lookup T[i] in a side-channel attack resistant manner using the aggregate table W and the tables U1 and U2. As a first step (1400), the variable "j" is set to (i div 2), the variable "k1" is set to (j xor r1) the variable "k2" is set to (j xor s1) and the variable "k" is set to (j xor r1 xor s1). In the next step (1401), the table W in RAM is accessed, with the variable "amval_low" being set to W[k1] and the variable "amval_hi" being set to W[k2]. Subsequently, in the next step (1402), the tables U1 and U2 in ROM are accessed, with the variable "mres_lo" being set to (amval_low xor U2[k]) and the variable "mres_hi" being set to (amval_hi xor U1[k]). The unmasking is done in step (1403), where the variable "res_lo" is set to (mres_low xor r2 xor s2) and the variable "res_hi" is set to (mres_hi xor s2 xor r2). From the definitions, it is easy to check that "res_lo" and "res_hi" are indeed equal to the values of U1[j] and U2[j]. The rest of the process is just a reconstruction of T[i] using the values U1[j] and U2[j] where "j" is (i div 2). First a check is made whether "i" is even or odd (1404) by checking whether or not (i mod 2) is 0. If "i" is even, then in step (1405), a variable "a" is set to the first nibble of "res_lo" and the variable "b" is set to be the first nibble of "res_hi" and a byte sized variable "result" is assigned to have its first nibble as "a" and second nibble as "b". It is easy to check the "result" equals T[i] in this case. In the case where "i" is odd, then in step (1406), a variable "a" is set to the second nibble of "res_lo" and the variable "b" is set to be the second nibble of "res_hi" and a byte sized variable "result" is assigned to have its first nibble as "a" and second nibble as "b". It is easy to check the "result" equals T[i] in this case as well. Thus in either case, the value of T[i] is the same as the value of "result" and can be assigned this value in step (1407). Thus we get a side-channel resistant implementation involving table lookups within the resource/addressing bounds.

Whereas, the exposition, thus far, was meant to provide a general description of how the invention would work for a wide variety of situations in which it is applicable, its full generality may not be obvious to those with only ordinary skill in the art. Therefore here we will explicitly point out some additional features and applications of this invention which we believe may not have been obvious to those with only ordinary skill in the art.

The assumption in the definition of the Table Mask operation that the indices to the masked table are masked by a single permutation and the output is masked by a single permutation has been made here for the purposes of clarity of exposition. As such this provides a countermeasure against first-order side-channel attacks. It is expected that those skilled in the art will be aware of more powerful attacks known in the literature as higher order side-channel attacks. Those skilled in the art will easily recognize that, in the Table Mask operation, in practice, the permutation for the index could be formed by composing several individual permutations and the output of the table could be masked by a permutation which is formed by composing several individual permutations. Those skilled in the art should also recognize upon reflection that the use of several individual permutations instead of a single permutations provides a generic mechanism to defeat higher-order side channel attacks and that this invention also provides the recipe for dealing with these more powerful attacks.

ADVANTAGEOUS EMBODIMENT

The protected table lookup scheme (described above) implemented in terms of the table splitting, table masking and table aggregation primitives will be illustrated for the COMP128 algorithm.

The COMP128 algorithm performs lookups of tables of sizes 512, 256, 128 and 64 bytes. In many chipcards and other devices, the amount of available RAM available is very small and has to be used judiciously. In particular, tables such as those described above cannot be accommodated in RAM, due to constraints of space. While there may be sufficient ROM/EEPROM available for the tables, a straightforward implementation of tables using ROM/EEPROM would leave the implementation vulnerable to side-channel attacks. Thus one has to resort to using the operations described above such as table splitting, table masking and table aggregation to implement tables in a protected manner on constrained memory devices.

For illustrative purposes, we describe how the 512 byte table of COMP128 which has 512 byte-sized data values having an index ranging from 0 to 511 is implemented on chipcards with available RAM being just a few bytes more than 256 bytes in a side-channel attack resistant manner. The original 512 byte is shown below. The table consists of 32 rows of 16 data values each. Each value is a byte and is shown using the hexadecimal notation below:

```
66 b1 ba a2 02 9c 70 4b 37 19 08 0c fb c1 f6 bc
6d d5 97 35 2a 4f bf 73 e9 f2 a4 df d1 94 6c a1
fc 25 f4 2f 40 d3 06 ed b9 a0 8b 71 4c 8a 3b 46
43 1a 0d 9d 3f b3 dd 1e d6 24 a6 45 98 7c cf 74
f7 c2 29 54 47 01 31 0e 5f 23 a9 15 60 4e d7 e1
b6 f3 1c 5c c9 76 04 4a f8 80 11 0b 92 84 f5 30
95 5a 78 27 57 e6 6a e8 af 13 7e be ca 8d 89 b0
fa 1b 65 28 db e3 3a 14 33 b2 62 d8 8c 16 20 79
3d 67 cb 48 1d 6e 55 d4 b4 cc 96 b7 0f 42 ac c4
38 c5 9e 00 64 2d 99 07 90 de a3 a7 3c 87 d2 e7
ae a5 26 f9 e0 22 dc e5 d9 d0 f1 44 ce bd 7d ff
ef 36 a8 59 7b 7a 49 91 75 ea 8f 63 81 c8 c0 52
68 aa 88 eb 5d 51 cd ad ec 5e 69 34 2e e4 c6 05
39 fe 61 9b 8e 85 c7 ab bb 32 41 b5 7f 6b 93 e2
b8 da 83 21 4d 56 1f 2c 58 3e ee 12 18 2b 9a 17
50 9f 86 6f 09 72 03 5b 10 82 53 0a c3 f0 fd 77
b1 66 a2 ba 9c 02 4b 70 19 37 0c 08 c1 fb bc f6
d5 6d 35 97 4f 2a 73 bf f2 e9 df a4 94 d1 a1 6c
25 fc 2f f4 d3 40 ed 06 a0 b9 71 8b 8a 4c 46 3b
1a 43 9d 0d b3 3f 1e dd 24 d6 45 a6 7c 98 74 cf
c2 f7 54 29 01 47 0e 31 23 5f 15 a9 4e 60 e1 d7
f3 b6 5c 1c 76 c9 4a 04 80 f8 0b 11 84 92 30 f5
5a 95 27 78 e6 57 e8 6a 13 af be 7e 8d ca b0 89
1b fa 28 65 e3 db 14 3a b2 33 d8 62 16 8c 79 20
67 3d 48 cb 6e 1d d4 55 cc b4 b7 96 42 0f c4 ac
c5 38 00 9e 2d 64 07 99 de 90 a7 a3 87 3c e7 d2
a5 ae f9 26 22 e0 e5 dc d0 d9 44 f1 bd ce ff 7d
36 ef 59 a8 7a 7b 91 49 ea 75 63 8f c8 81 52 c0
aa 68 eb 88 51 5d ad cd 5e ec 34 69 e4 2e 05 c6
fe 39 9b 61 85 8e ab c7 32 bb b5 41 6b 7f e2 93
da b8 21 83 56 4d 2c 1f 3e 58 12 ee 2b 18 17 9a
9f 50 6f 86 72 09 5b 03 82 10 0a 53 f0 c3 77 fd
```

Let us call the original 512 byte COMP128 table, table T. Clearly T: $\{0,1\}^9 \rightarrow \{0,1\}^8$, that is it takes a 9-bit index and yields an 8-bit output. The first version of the COMP128 algorithm is written assuming that the 512 byte table is resident in ROM but this is clearly susceptible to side-channel attacks. The present invention is then applied to convert the implementation to one which is resistant to side-channel attacks.

As a first step, since the table size of T, which is 512 bytes, exceeds the amount of available RAM which is just a few bytes more than 256, the Table T should be split. In this embodiment the Two-way Byte Table splitting method is applied to obtain two tables U1 and U2 where U1:$\{0,1\}^8 \rightarrow \{0,1\}^8$ and U2:$\{0,1\}^8 \rightarrow \{0,1\}^8$. Each of these tables takes an 8-bit index and produces and 8-bit output value. Note that each of U1 and U2 is 256 bytes in size. The resulting tables U1 and U2 are shown below. Each of the tables, U1 and U2, consists of 16 rows of 16 byte sized data values each. The byte values have been shown in hexadecimal notation.

TABLE U1

```
16 2a c2 b0 97 c8 1b c6 5d 57 fa 3f 29 f4 41 1c
5c f4 30 d6 09 1b ac 6b a3 dd 3f ed 46 56 c8 4f
27 49 17 e1 3f 59 e0 17 36 cc 69 a4 08 b1 42 05
a5 78 67 8a 3f ee da 09 ba 85 3b 4a 23 82 6c 90
7d 8b ed 45 c4 76 2f 4c 58 0e d4 79 e0 73 7c 72
5e 96 20 5c 09 41 de fd 6f 98 ab 19 a5 3f 81 20
a8 b8 1d dd ec 49 4e 56 e9 b1 5e b7 2b 51 bf 23
a8 13 6d cf e8 2e b8 7a f0 f6 29 b3 20 a3 03 7d
61 a2 2c 0b 79 8c b1 6c d5 75 af f3 92 4f 14 c1
c5 4f 03 6d 90 b1 ca b6 3a dd f3 de 64 65 8c f4
72 94 71 1e f3 95 0e 71 63 cc 96 4a 80 1b 24 50
5a 87 76 a8 f3 ee ad 90 ab 58 b3 a4 32 28 c6 09
d7 b8 de 54 4c 67 f2 c4 85 e0 4d 97 0e 37 c7 27
e5 69 02 c5 90 14 ed df f6 89 ba 91 5a f3 18 02
8a 8b d1 dd ce 94 e4 65 9e 1b e5 7b b2 15 fb 32
8a 31 d6 fc 8e e2 8b a7 0f 6f 92 3b 02 3a 30 d7
```

TABLE U2

```
b6 ab 90 47 13 00 cf bf d6 39 42 7b fe da 9d a6
2f 2f d4 e0 ab 78 84 43 14 90 b3 1d 2d 4a 79 7c
cf 52 04 03 25 1a 46 ed fb 51 7c 40 8f 01 89 3f
59 27 e5 e6 1a b7 8c b8 1f 26 ed 13 b3 d6 18 72
63 4c 61 d5 cb b9 40 ca c3 09 26 09 d9 aa 83 ed
aa f2 2e ed dd 4f bc f7 3e 5a 77 94 e7 68 c8 5c
a6 e8 55 ac 5e 36 e2 0c f3 96 88 ac 3b b4 67 e9
db 28 54 21 35 1e 21 19 95 68 70 50 81 05 fc 7f
6b ba 09 74 31 00 fc fb 6d 93 24 b7 ef ad d9 6a
f2 f2 4d 0e ba 87 48 34 41 09 3b d1 d2 a4 97 c7
fc 25 40 30 52 a1 64 de bf 15 c7 04 f8 10 98 f3
95 72 5e 6e a1 7b c8 8b f1 62 de 31 3b 6d 81 27
36 c4 16 5d bc 9b 04 ac 3c 90 62 90 9d aa 38 de
aa 2f e2 de dd f4 cb 7f e3 a5 77 49 7e 86 8c c5
6a 8e 55 ca e5 63 2e c0 3f 69 88 ca b3 4b 76 9e
bd 82 45 12 53 e1 12 91 59 86 07 05 18 50 cf f7
```

Next, the table masking primitive to create masked versions V1 and V2 of U1 and U2 respectively. In this embodiment, the Input-Output XOR Permutation method is "conceptually applied" to create the masked tables V1 and V2 from U1 and U2. Recall that the Input-Output XOR Permutation method works as follows: Let the symbol "⊕" denote the XOR operator. Pick two 8-bit random masks for each table, say r1 and r2 for table U1 (s1 and s2 for table U2 respectively). The indices and entries of U1 (resp. U2) are masked by xor'ing them with r1 and r2 (resp s1 and s2) respectively. That is V1[i ⊕r1]=U1[i]⊕r2. Similarly for U2 and V2.

As an example, assume that for the masking of table U1, r1=E4 and r2 =8C. Also assume that for masking table U2, s1=A5 and s2=3B. The resulting masked tables V1 and V2 are shown below. Note that masking does not change the size of the table. Both V1 and V2 consist of 16 rows of 16 byte-sized data values each. Each of the data values has been shown in hexadecimal notation.

TABLE V1

42 18 68 e9 06 07 5d 51 3e 99 77 be 12 97 69 f7
02 6e 07 2b 06 bd 5a 70 8e b6 bc 5b 83 e3 1e b7
c0 eb 7e 48 5b 34 52 d8 82 bb 4b ab 09 6c c1 1b
1c 98 61 53 69 e5 8e 49 d6 7f 94 8e 7a 05 36 1d
7f 19 82 fd fe 18 fd 92 0c 97 a8 dc ef 40 1a c6
7f 62 21 1c d6 0b fa 24 be a4 4a 85 27 d4 3f 28
f5 00 3d e0 ed 2e a0 87 1e c3 98 4d 59 f9 23 7f
1c 3d 46 3a 49 c3 8f e1 e8 e9 00 78 b6 51 7f 52
60 c5 c2 da 24 34 91 51 a7 dd 33 af 65 3d d2 3b
64 a2 34 f6 24 9f e1 43 ac 2f 8f f1 7c 7a a5 3f
48 fa a3 c0 f1 07 61 c9 6c ff f0 fe d4 82 58 f5
85 cd 52 71 d2 1a ac d0 29 b3 0d ac e3 14 27 95
b3 d5 6c 9b ab c5 9b 6d 84 3d ce 89 ba 40 e5 28
b3 62 56 85 29 f4 eb 06 af 0e e0 1c 36 09 b7 c6
1b 44 97 4a 9a a6 4e 3c a5 78 cd 90 d1 db 76 b3
85 97 20 e7 d0 78 bc 5a ca da 44 c3 2f 51 b3 61

TABLE V2

9a 69 e5 5f 1e c7 0b 7b 2b c3 c8 a3 2e 84 3f fc
40 9a b0 f3 49 ae 55 65 56 00 1c ba 59 ca 0a e5
3b 0a c0 c7 81 50 4f 32 96 d4 51 e2 a8 56 8c 1f
bc 81 0f 73 c9 c9 35 76 9f e9 fc ac 32 7a ea 00
58 de fb 15 b5 51 f1 6e 70 88 a5 4d 52 04 f1 b3
da 68 aa 29 b9 86 29 7e 6b 23 cc f4 bd 62 3e 3c
a0 87 97 3f ff 0d 66 2d 91 a6 e5 03 ab 07 ab 59
cf e6 44 f0 14 91 e5 d9 bd 45 fe b7 9e d8 72 4c
21 1e d6 7d 69 f4 38 3f 3a b4 04 b2 6a c0 7b 47
8c 21 83 b7 1c 62 dd de ed 88 49 23 1d 24 28 d6
3b 28 84 f4 90 8d 7c ab e1 c5 9d a6 02 ed 40 79
43 90 78 bf 14 14 db ef 71 16 47 42 ab 2f 26 88
0d 65 37 d9 d3 9d 97 6e 8f 00 d2 5c ad c8 97 b3
25 0e 22 1a 13 e0 1a 6f 3e ba 44 c7 53 ae 6b 4b
82 f0 f1 7b 77 58 ee 5a 91 e2 d6 b8 32 f8 32 1d
74 e6 cc 87 c9 91 d6 15 53 dc 67 f3 61 05 af 4c

Since the tables V1 and V2 are each of size 256 bytes, together they will occupy 512 bytes of RAM. Since that is more than available RAM, a table aggregate operation is recommended. As a next step the table aggregation primitive to create an aggregate table W of size 256 bytes. In this embodiment this is done using the Byte-wise XOR Aggregate method. Using this method W is computed as W=V1⊕V2, i.e, W is the Byte-wise XOR of corresponding bytes of V1 and V2, i.e., for any i between 0 and 255, W[i]=V1[i]⊕V2[i]. Note that the construction of table W can be done on a byte by byte basis in RAM. If V1 and V2 are computed on a byte by byte basis, i.e., the masking operation is "conceptually applied" then the entire construction of W from U1 and U2 does not need space larger than the size of each of the individual tables.

For illustrative purposes, the resulting table W is shown below. Note that table aggregation results in a table of the same size, that is, a table consisting of 16 rows of 16 byte-sized data values each. Once again, the data values are shown in hexadecimal notation.

TABLE W d8 71 8d b6 18 c0 56 2a 15 5a bf 1d 3c 13 56 0b
42 f4 b7 d8 4f 13 0f 15 d8 b6 a0 e1 da 29 14 52
fb e1 be 8f da 64 1d ea 14 6f 1a 49 a1 3a 4d 04
a0 19 6e 20 a0 2c bb 3f 49 96 68 22 48 7f dc 1d
27 c7 79 e8 4b 49 0c fc 7c 1f 0d 91 bd 44 eb 75
a5 0a 8b 35 6f 8d d3 5a d5 87 86 71 9a b6 01 14
55 87 aa df 12 23 c6 aa 8f 65 7d 4e f2 fe 88 26
d3 db 02 ca 5d 52 6a 38 55 ac fe cf 28 89 0d 1e
41 db 14 a7 4d c0 a9 6e 6d 69 37 1d 0f fd a9 7c

TABLE W-continued e8 83 b7 41 38 fd 3c 9d 41 a7 c6 d2 61 5e 8d e9
73 d2 27 34 61 8a 1d 62 8d 3a 6d 58 d6 6f 18 8c
c6 5d 2a ce c6 0e 77 3f 58 a5 4a ee 48 3b 01 1d
be b0 5b 42 78 58 0c 03 0b 3d 1c d5 17 88 72 9b
96 6c 74 9f 3a 14 f1 69 91 b4 a4 db 65 a7 dc 8d
99 b4 66 31 ed fe a0 66 34 9a 1b 28 e3 23 44 ae
f1 71 ec 60 19 e9 6a 4f 99 06 23 30 4e 54 1c 2d The table W is kept in RAM whereas the tables U1 and U2 are kept in ROM. The side-channel attack resistant version of the COMP128 algorithm is now written to use the table W and tables U1 and U2 instead of T. Note that when the original algorithm looks up index i in the table T, the output T[i] is an 8-bit value. This lookup operation is replaced by a sequence of steps which use the tables W, U1 and U2 instead of T[i] but provide the same result. This is done as follows:

First j=i div 2 is computed. Clearly, T[i] can be computed using the values of U1[j] and U2[j], but that would still be vulnerable to side channel attacks since the index j is not randomized. Instead an alternative approach is used. First set k1=⊕r1 and k2 =j⊕s1. Note that the output W[k1] is really the value V1[k1]⊕V2[k1]. This value is the same as U1[k1⊕r1]⊕r2⊕U2[k1⊕s1]⊕s2. Using the fact that k1=j⊕r1, this value is the same as U1[j]⊕r2⊕U2[k1⊕s1]⊕s2. The algorithm can use the original table U2 (stored in ROM/EEPROM) to get the value of U2[k1⊕s1], xor this value with the U1[j]⊕r2⊕U2[k1⊕s1]⊕s2 to get U1[j]⊕r2⊕s2. The masks r2 and s2 can then be removed by xoring to yield U1[i]. A similar process is followed to yield U2[j]. Depending on whether the value of (1 mod 2) is 0 or 1, the first or second half of the bytes of U1[j] and U2[j] are retrieved and concatenated to return the value of the table lookup T[i]. In an actual implementation of COMP128, for defense against side-channel attacks, it is not advisable to compute unmasked values of U1[j] and U2[j] or T[i] but it is acceptable to compute these values masked by known random values. Thus in this embodiment when the XOR masks of r2 and s2 are removed from the masked value of U1[j] or U2[j] and additional known random mask R1 and R2 can be simultaneously applied, i.e., the values computed will be U1[j]⊕R1 and U2[j]⊕R2. This can be accomplished, for example, if the unmasking of U1[j]⊕r2⊕s2 is done by first XOR masking with R1 and then removing the masks r2 and s2 using XOR. Using the masked values of U1[j] and U2[j] in the calculation of T[i] will again result in a masked value of T[i], i.e., the result will be T[i]⊕R3 where R3 is another known random mask related to R1 and R2.

In the description of the invention, thus far, an assumption has been made in the definition of the Table Mask operation that the indices to the masked table are masked by a single permutation and the output is masked by a single permutation. This assumption was made solely for the purposes of clarity of exposition as should not be viewed as limiting requirement for this invention. As such, the above description of the present invention provides a countermeasure against first-order side-channel attacks. It is expected that those skilled in the art will be aware of more powerful attacks known in the literature as higher order side-channel attacks. Those skilled in the art will easily recognize that, in the Table Mask operation, in practice, the permutation for the index could be formed by composing several individual permutations and the output of the table could be masked by a permutation which is formed by composing several individual permutations. Those skilled in the art should also recognize upon reflection that the use of several individual permutations instead of a single permutations provides a generic mechanism to defeat higher-order side-channel attacks and therefore this invention also provides a way to resist these more powerful attacks.

Thus the present invention provides a method including the steps of: providing a data processing operation involving at least one known lookup table, wherein each particular table from said at least one known lookup table has a particular lookup table size and a particular lookup table index size; creating at least one randomized table in which entries and/or indices are statistically independent of entries and/or indices of any table from said at least one known lookup table, each individual table from said at least one randomized table has a randomized table size, wherein a first sum of sizes of all said randomized tables is smaller than a second sum of sizes of all known lookup tables, and/or the maximum index size of said randomized tables is less than the maximum index size of the known lookup tables.

In some embodiments of the method, the method also includes performing said data processing operation employing said first randomized table; and/or the step of providing includes obtaining said data processing operation; and/or the step of creating said at least one randomized table includes the step of applying a Table Split operation to at least one of said known lookup tables resulting in split lookup tables; and/or the step of creating said at least one randomized table includes the step of applying a Table Masking operation to at least one of said known lookup tables and/or split lookup tables resulting in masked tables; and/or the step of creating said at least one randomized table includes the step of applying a Table Aggregate operation to at least one of said masked tables.

It is noted that the step of applying a Table Split operation can use a variety of Table Splitting methods. For example, in an advantageous embodiment the step of applying a Table Split operation is performed by employing a Two-way Byte Table Splitting Method. Similarly, the step of applying a Table Masking operation can use a variety of table masking methods. For example, in an advantageous embodiment the step of applying a Table Mask operation is performed by employing an Input-Output Permutation Masking Method.

Similarly, the step of applying a Table Aggregate operation can use a variety of table aggregating methods. For example, in an advantageous embodiment the step of applying a Table Aggregate operation is performed by employing an Entry-wise Algebraic Aggregate Method. The known lookup table could be a table from any information security application or technique. For example the table could be from the COMP128 cryptographic algorithm or the Data Encryption Standard (DES) etc. For information security applications requiring resistance to side channel attacks, the method known as General Countermeasure Against Side-channel Attacks is usually employed as described earlier. Thus in some embodiments of this method, the lookup table is a table from an application of General Countermeasure Against Side Channel Attacks.

In some embodiments of the method, the number of elements in said at least one known lookup table is given by a power of two. As described earlier, those skilled in the art will easily recognize that having the number of elements in said at least one known lookup table be given by a power of two is particularly advantageous, since that provides the best efficiencies in the application of this invention. However, the methods described in the present invention are not limited to the case where the number of elements is a power of two, for example in one embodiment the number of elements in the lookup table is 200.

In some embodiments of the method, the said at least one randomized table is employed in a cryptographic process and the said at least one randomized table is used for securely handling information in said cryptographic process. In some of these embodiments, prior to performing said cryptographic process the information is transformed by applying a secret-sharing operation to the elements of the information where each element of the information is related to multiple elements of the transformed information, then the cryptographic process is performed on the transformed information involving the use of said at least one randomized table and then the transformed and cryptographically processed information is retransformed back by applying an inverse secret-sharing operation to yield the cryptographically processed information.

In some embodiments of the method the indices to at least one masked table of said plurality of masked tables is are masked by a single permutation and data values in the masked table are masked by a single permutation and/or data processing operation is employed as a countermeasure against at least one first-order side-channel attack. In some embodiments, at least one higher-order side-channel attack is defeated by having the step of applying Table Mask operation include employing permutations for index and/or data values formed by composing several individual permutations Thus the present invention also provides a method including the steps of: providing a lookup table for a data processing operation; performing a table split operation upon said lookup table in forming a collection of split tables; performing a table mask operation upon said collection of split tables and/or upon other lookup tables in forming a plurality of masked tables; performing a table aggregate operation on at least two of said plurality of masked tables in forming at least one aggregate table; and performing said data processing operation on a combination of split, masked aggregate and lookup tables.

Thus the present invention also provides a method including the steps of: providing a data processing operation involving at least one known lookup table, each particular table from said at least one known lookup table having a particular lookup table size and a particular lookup table index size; declaring any lookup table from said at least one known lookup table to be splittable: if the table lookup size of said any lookup table is larger than an amount of RAM available, or if the table index size of said any lookup table is larger than available addressing capability; performing a table split operation upon said any lookup table declared splittable in the step of declaring and forming a collection of split tables; performing a table mask operation upon said collection of split tables and/or other of said known lookup tables forming a plurality of masked tables; performing said data processing operation on a combination of split, masked table, aggregate and lookup tables.

In some embodiments, of the method, the method further includes: performing at least one table aggregate operation on at least two of said plurality of masked tables forming at least one aggregate table; and/or the step of performing said data processing operation includes performing a table aggregate operation whenever a total size of all masked tables exceeds an amount of RAM available; and/or the step of providing includes obtaining the data processing operation.

The step of performing Table Split is accomplished in various embodiments using a variety of table splitting methods.

In an advantageous embodiment the step of performing a Table Split operation employs the Output Divisor Table Splitting Method. Similarly, the step of performing Table Mask is accomplished in various embodiments using a variety of table masking methods. In an advantageous embodiment the step of performing a Table Mask operation employs the Input-Output XOR permutation Masking Method. Similarly, the step of performing Table Aggregate is accomplished in various embodiments using a variety of table aggregating methods. In an advantageous embodiment the step of performing a Table Aggregate operation employs the Byte-wise XOR Aggregate Method. In embodiments of the method, the step of performing said data processing operation involves any combination of aggregate, split, masked and known lookup tables. Thus, particular needs of an application may use aggregate and known tables and others may use some other combination. In general, many applications will use at least one of the masked and/or aggregate tables, and at least one of the known and/or split tables. In some of these embodiments only the split and masked tables are involved in this step, that is, there is no aggregate table. For example, this case occurs in an embodiment where there is enough available RAM but the index of at least one known lookup table is large. In other embodiments only the aggregate tables and split tables are involved in this step, that is, the masked tables that were created have been aggregated into aggregated table. For example, this case occurs in an embodiment where there is very little available RAM and it is not feasible to keep an unaggregated masked table in RAM. In other embodiments all four of these tables are used.

Thus the present invention also provides a method including the steps of: providing a data processing operation involving a first lookup table, said lookup table having a first lookup table size and a first lookup table index size; creating a first randomized table in which entries; and/or indices are statistically independent of entries; and/or indices of said first lookup table, said first randomized table having a randomized table size being smaller than said first lookup table size; and/or a randomized table index size smaller than said first lookup table index size. In some embodiments of the method, the method further includes performing said data processing operation employing said first randomized table. In some embodiments of the method, there are multiple tables that need to be looked up thus in those embodiments the first lookup table is a first collection of tables. Also in some embodiments multiple randomized tables are created and thus the first randomized table is a first collection of randomized tables.

Thus the present invention also provides a method including the steps of: providing a data processing operation involving a first lookup table, said lookup table having a first lookup table size; creating a randomized table in which entries or indices are statistically independent of entries or indices of said first lookup table, said randomized table having a randomized table size being smaller than said first lookup table size. In some embodiments, the method further includes performing said data processing operation employing said randomized table.

Thus the present invention also provides a method including the steps of: providing a data processing operation involving a first lookup table in a cryptographic process, said lookup table having a first lookup table size; creating a randomized table in which entries or indices are statistically independent of entries or indices of said first lookup table, said randomized table having a randomized table size being smaller than said first lookup table size; employing said randomized table for securely handling information in said cryptographic process; prior to performing the cryptographic process, transforming the information by applying a secret-sharing operation to the elements of the information where each element of the information is related to multiple elements of the transformed information; performing the cryptographic process on the transformed information involving the use of said randomized table; and retransforming the transformed and cryptographically processed information by applying an inverse secret-sharing operation to the transformed and cryptographically processed information.

In some embodiments of the method, the method also includes performing said data processing operation employing said randomized table. In some embodiments of the method, the cryptographic process is performed in a cryptographic information processing system or device. In some embodiments, any of the methods described herein is implemented as a module within a chip card.

Figure 15:
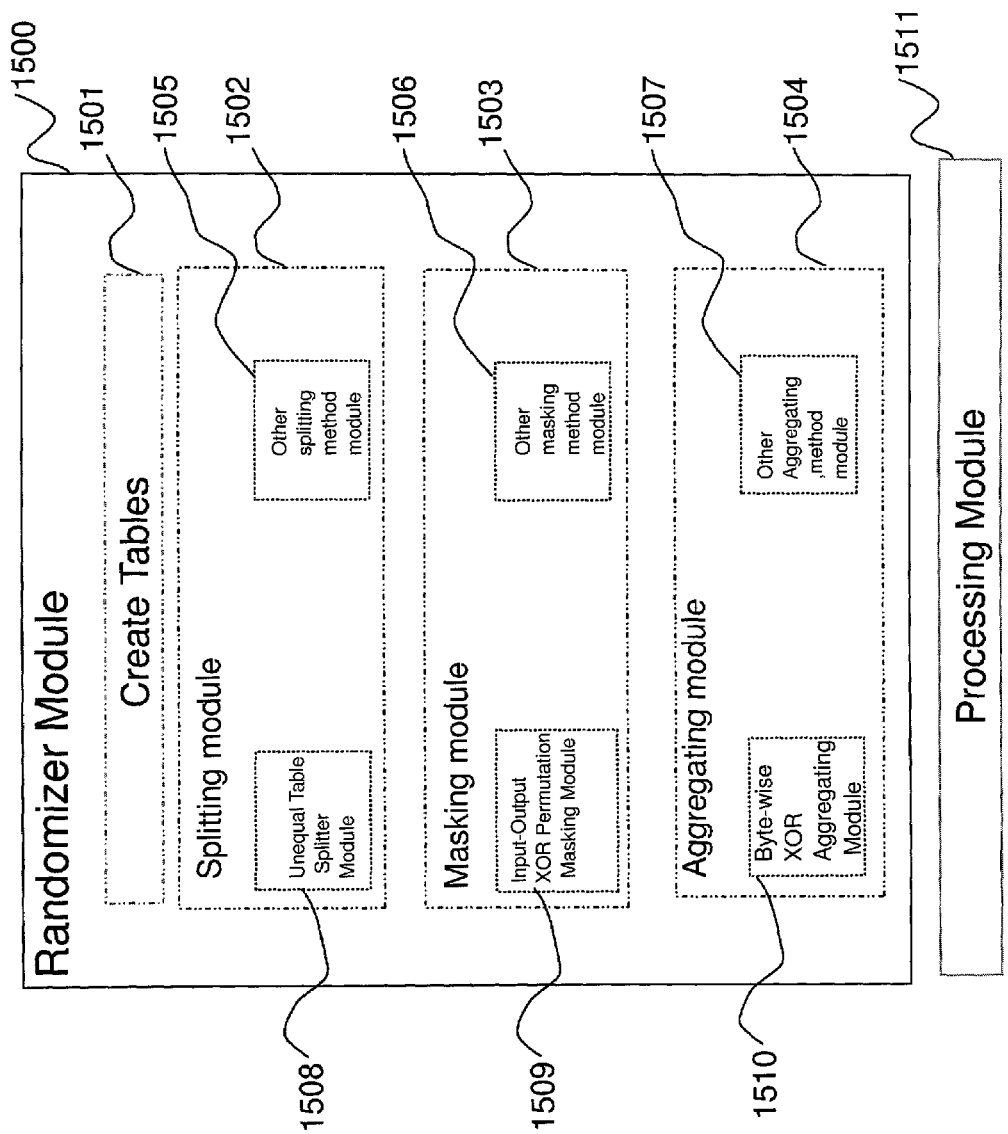
FIG. 15, shows an example of a generic diagram of an apparatus realizing present invention.

The present invention is also realized as an apparatus in some embodiments. FIG. 15 shows a generic diagram of one type of apparatus for realizing this invention. There are two main modules, the randomizer module (1500) and the processing module (1501). The randomizer module is responsible for creating random tables from a set of known tables. These known tables are either provided to the randomizer module or are generated by the randomizer by means of an optional module to create known tables (1501). The random tables have the property that their data values and indices are statistically independent of the data values and indices of the known tables. In some embodiments, the randomizer module contains a Splitting module to perform the Table Split operation (1502). In some embodiments, the randomizer module contains a Masking module to perform the Table Mask operation (1503). In some embodiments, the randomizer module contains an Aggregating module to perform the Table Aggregate operation (1504). A splitting module if present contains one or more modules for specific methods of performing the Table Split operation. For example it could contain a Unequal Table Splitter Module to perform the Unequal Table Splitting Method (1508); and/or it could contain other Table splitting method module or modules (1505). A masking module if present contains one or more modules for specific methods of performing the Table Mask operation. For example it could contain a Input-Output XOR Permutation Masking Module (1509) to perform the Unequal Table Splitting Method; and/or it could contain other modules for some other Table Masking method (1506). An aggregating module if present contains one or more modules for specific methods of performing the Table Aggregate operation. For example it could contain a Byte-wise XOR Aggregating Module (1510) to perform the Byte-wise XOR Aggregating Method; and/or it could contain other modules for some other Table Aggregating method (1507).

Thus, the present invention is also realized as an apparatus. In some embodiments, the apparatus includes: a randomizer module to create at least one randomized table in which entries and/or indices are statistically independent of entries, and/or indices of any table from a provided set of known lookup tables, each individual table from said at least one randomized table having a randomized table size, wherein a first sum of sizes of all said randomized tables is smaller than a second sum of sizes of all said at least one known lookup tables, and/or the maximum index size of said randomized tables is less than the maximum index size of the known lookup tables; and a processing module to perform said data processing operation employing said first randomized table.

In some embodiments of the apparatus the randomizer module forms said provided set of known lookup tables; and/or the randomizer module includes a splitting module to perform a Table Split operation upon at least a subset of said set of known lookup tables resulting in split lookup tables; and/or the randomizer module includes a masking module to perform a Table Masking operation upon at least a subset of said set of known lookup tables; and/or split lookup tables forming a set of masked tables; and/or the randomizing module includes an aggregating module to perform a Table Aggregate operation to at least one masked table.

In some embodiments of the apparatus, the splitting module within the randomizer module includes an Unequal Table Splitter Module which applies the Unequal Table Split Method for performing a Table Split Operation. In some embodiments of the apparatus, the masking module within the randomizer module includes an Input-Output XOR Permutation Masking module which applies the Input-Output XOR Permutation Masking Method for performing a Table Mask Operation. In some embodiments of the apparatus, the aggregating module within the randomizer module includes an Byte-wise XOR Aggregating Module which applies the Byte-wise XOR Aggregating Method for performing a Table Aggregate Operation.

Thus the present invention is also realized as an apparatus including: a splitting module to perform a table split operation upon a provided set of lookup tables, forming a collection of split tables; a masking module to perform a table mask operation upon said collection of split tables; and/or other lookup tables forming a plurality of masked tables; an aggregating module to perform a table aggregate operation on a subset of said plurality of masked tables; and a processing module to perform said data processing operation.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention.

Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. For example, although the description indicates use of the present invention for known lookup tables it is most particularly applicable to fixed lookup tables. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

We claim:

1. A method comprising:
providing a data processing operation involving at least one lookup table, each particular table from said at least one lookup table having a particular lookup table size and a particular lookup table index size; and
creating at least one randomized table in which entries and/or indices are statistically independent from entries and/or indices of said at least one lookup table, each individual table from said at least one randomized table having a randomized table size, wherein a first sum of sizes of all said randomized tables is smaller than a second sum of sizes of all lookup tables, or the maximum index size of said randomized tables is less than the maximum index size of the lookup tables, wherein the step of creating said at least one randomized table includes applying a Table Masking operation to at least one of said lookup tables and/or to split lookup tables resulting in masked tables.

2. A method as recited in claim 1, further comprising performing said data processing operation employing said at least one randomized table.

3. A method as recited in claim 1, wherein the step of providing includes obtaining said data processing operation.

4. A method as recited in claim 1, wherein the step of creating said at least one randomized table includes applying a Table Split operation to at least one of said lookup tables resulting in split lookup tables; and/or applying a Table Masking operation to at least one of said lookup tables and/or split lookup tables resulting in masked tables.

5. A method as recited in claim 4, wherein the step of applying a Table Split operation includes employing a Two-way Byte Table Splitting Method.

6. A method as recited in claim 1, wherein the step of creating said at least one randomized table includes the step of applying a Table Aggregate operation to at least one of said masked tables.

7. A method as recited in claim 6, wherein the step of applying a Table Aggregate operation includes employing an Envy-wise Algebraic Aggregate Method.

8. A method as recited in claim 1, wherein the step of applying a Table Mask operation includes employing a Input-Output Permutation Masking Method.

9. A method as recited in claim 1, wherein said at least one table is a table from a COMP128 application.

10. A method as recited in claim 1, wherein a number of elements in said at least one lookup table is given by a power of two.

11. A method as recited in claim 1, further comprising:
employing said at least one randomized table in a cryptographic process;
applying said at least one randomized table for securely handling information in said cryptographic process.

12. A method as recited in claim 11, further comprising:
prior to performing said cryptographic process, transforming the information by applying a secret-sharing operation to the elements of the information where each element of the information is related to multiple elements of the transformed information;
performing the cryptographic process on the transformed information involving the use of said randomized table; and
retransforming the transformed and cryptographically processed information by applying an inverse secret-sharing operation to the transformed and cryptographically processed information.

13. A method as recited in claim 1, wherein indices to at least one masked table of said plurality of masked tables are masked by a single permutation and data values in said at least one masked table are masked by a single permutation.

14. A method as recited in claim 1, further comprising employing the data processing operation as a countermeasure against at least one first-order side-channel attack.

15. A method as recited in claim 1, wherein the step of applying Table Mask operation includes employing permutations for index and/or data values formed by composing several individual permutations.

16. A method as recited in claim 1, wherein the step of applying the Table Mask operation includes employing several individual permutations to defeat at least one higher-order side-channel attack.

17. A method as recited in claim 1, wherein said at least one table is a table from an application of General Countermeasure Against Side-channel Attacks.

18. A method as recited in claim 1, wherein a number of elements in said at least one lookup table is 200.

19. An article of manufacture comprising a computer usable medium having computer readable program code means embodied therein for causing resistance to side-channel attacks, the computer readable program code means in said article of manufacture comprising computer readable program code means for causing a computer to effect the steps of claim 1.

20. A chip card comprising a module implementing the steps of claim 1.

21. A method as recited in claim 1, wherein said at least one lookup table is fixed.

22. A program storage device readable by machine, tangibly embodying a program of instructions executable by the machine to perform method steps for causing resistance to side-channel attacks, said method steps comprising the steps of claim 1.

23. A method comprising:
providing a lookup table for a data processing operation;
performing a table split operation upon said lookup table in forming a collection of split tables;
performing a table mask operation upon said collection of split tables and/or upon other lookup tables in forming a plurality of masked tables;
performing a table aggregate operation on at least two of said plurality of masked tables in forming at least one aggregate table; and
performing said data processing operation on a combination of split, masked, aggregate and lookup tables.

24. An article of manufacture comprising a computer usable medium having computer readable program code means embodied therein for causing resistance to side-channel attacks, the computer readable program code means in said article of manufacture comprising computer readable program code means for causing a computer to effect the steps of claim 23.

25. A method comprising:
providing a data processing operation involving at least one lookup table, each particular table from said at least one lookup table having a particular lookup table size and a particular lookup table index size;
declaring any lookup table from said at least one lookup table to be splittable:
if the table lookup size of said any lookup table is larger than an amount of RAM available, or
if the table index size of said any lookup table is larger than available addressing capability;
performing a table split operation upon said any lookup table declared splittable in the step of declaring and forming a collection of split tables;
performing a table mask operation upon said collection of split tables and/or other of said lookup tables forming a plurality of masked tables; and
performing said data processing operation on a combination of split, masked, aggregate and lookup tables.

26. A method as recited in claim 25, further comprising performing at least one table aggregate operation on at least two of said plurality of masked tables forming at least one aggregate table.

27. A method as recited in claim 26, wherein the step of performing said data processing operation includes performing a table aggregate operation whenever a total size of all masked tables exceeds an amount of RAM available.

28. A method as recited in claim 26, wherein the step of providing includes obtaining the data processing operation.

29. A method as recited in claim 26, wherein said table aggregate operation includes employing a Byte-wise XOR Aggregate Method.

30. A method as recited in claim 26, further comprising performing said data processing operation on a combination of split, masked, aggregate and lookup tables.

31. A method as recited in claim 25, wherein the step of performing a table split operation includes employing an Output Divisor Table Splitting Method.

32. A method as recited in claim 25, wherein the step of performing a table mask operation includes employing an Input-Output XOR Permutation Masking Method.

33. A method as recited in claim 25, further comprising employing the data processing operation as a countermeasure against at least one side channel attack.

34. An article of manufacture comprising a computer usable medium having computer readable program code means embodied therein for causing resistance to side-channel attacks, the computer readable program code means in said article of manufacture comprising computer readable program code means for causing a computer to effect the steps of claim 25.

35. A program storage device readable by machine, tangibly embodying a program of instructions executable by the machine to perform method steps for causing resistance to side-channel attacks, said method steps comprising the steps of claim 25.

36. An apparatus comprising:
means for declaring any lookup table from a provided set of lookup table to be splittable if the table lookup size of said any lookup table is larger than an amount of RAM available, or if the table index size of said any lookup table is larger than available addressing capability, each particular table from said set of lookup tables having a particular lookup table size and a particular lookup table index size, said any lookup table;
means for performing a table split operation upon said any lookup table declared splittable in the means for declaring and forming a collection of split tables;
means for performing a table mask operation upon said collection of split tables and/or other of said lookup tables forming a plurality of masked tables; and
means for performing said data processing operation upon a combination of split, masked, aggregate and lookup tables.

37. An apparatus as recited in claim 36, further comprising means for performing a table aggregate operation on at least two of said plurality of masked tables.

38. An apparatus as recited in claim 37, wherein the means for performing a table aggregate operation performs the table aggregate operation when the total size of all masked tables exceeds the amount of RAM available.

39. An apparatus as recited in claim 36, wherein the means for declaring obtains said any lookup tables from another module.

40. A computer program product comprising a computer usable medium having computer readable program code means embodied therein for causing resistance to side-channel attacks, the computer readable program code means in said computer program product comprising computer readable program code means for causing a computer to effect the functions of claim 36.

41. A method comprising
providing a data processing operation involving a first lookup table in a cryptographic process, said lookup table having a first lookup table size;
creating a randomized table in which entries or indices are statistically independent of entries or indices of said first lookup table, said randomized table having a randomized table size being smaller than said first lookup table size, wherein the step of creating said at least one randomized table includes applying a Table Split operation to at least one of said lookup tables resulting in split lookup tables; and/or applying a Table Masking operation to at least one of said lookup tables and/or split lookup tables resulting in masked tables, and wherein the step of applying a Table Split operation includes employing a Two-way Byte Table Splitting Method;
employing said randomized table for securely handling information in said cryptographic process;
prior to performing the cryptographic process, transforming the information by applying a secret-sharing operation to the elements of the information where each element of the information is related to multiple elements of the transformed information;
performing the cryptographic process on the transformed information involving the use of said randomized table; and
retransforming the transformed and cryptographically processed information by applying an inverse secret-sharing operation to the transformed and cryptographically processed information.

42. A method as recited in claim 41, further comprising performing said data processing operation employing said randomized table.

43. A method as recited in claim 41, wherein said cryptographic process is performed in a cryptographic information processing system or device.

44. An article of manufacture comprising a computer usable medium having computer readable program code means embodied therein for causing resistance to side-channel attacks, the computer readable program code means in said article of manufacture comprising computer readable program code means for causing a computer to effect the steps of claim 41.

45. A program storage device readable by machine, tangibly embodying a program of instructions executable by the machine to perform method steps for causing resistance to side-channel attacks, said method steps comprising the steps of claim 41.

46. An apparatus comprising:
a randomizer module to create at least one randomized table in which entries and/or indices are statistically independent of entries and/or indices of any table from a provided set of lookup tables, each individual table from said at least one randomized table having a randomized table size, wherein:
a first sum of sizes of all said randomized tables is smaller than a second sum of sizes of all said at least one lookup tables, or
the maximum index size of said randomized tables is less than the maximum index size of the lookup tables; and
a processing module to perform said data processing operation employing said first randomized table, wherein said at least one randomized table applies a Table Split operation to at least one of said lookup tables resulting in split lookup tables; and/or applies Table Masking operation to at least one of said lookup tables and/or split lookup tables resulting in masked tables, and wherein the Table Split operation employs a Two-way Byte Table Splitting Method.

47. An apparatus as recited in claim 46, wherein the randomizer module forms said provided set of lookup tables.

48. An apparatus as recited in claim 46, wherein the randomizer module includes a splitting module to perform a Table Split operation upon at least a subset of said set of lookup tables resulting in split lookup tables.

49. An apparatus as recited in claim 48, wherein the randomizing module includes an aggregating module to perform a Table Aggregate operation to at least one masked table.

50. An apparatus as recited in claim 49, wherein the aggregating module includes an Byte-wise XOR Aggregating Module which applies the Byte-wise XOR Aggregating Method for performing a Table Aggregate Operation.

51. An apparatus as recited in claim 48, wherein the splitting module includes an Unequal Table Splitter Module which applies the Unequal Table Split Method for performing a Table Split Operation.

52. An apparatus as recited in claim 46, wherein the randomizer module includes a masking module to perform a Table Masking operation upon at least a subset of said set of lookup tables and/or split lookup tables forming a set of masked tables.

53. An apparatus as recited in claim 52, wherein the masking module includes an Input-Output XOR Permutation Masking module which applies the Input-Output XOR Permutation Masking Method for performing a Table Mask Operation.

54. A computer program product comprising a computer usable medium having computer readable program code means embodied therein for causing resistance to side-channel attacks, the computer readable program code means in said computer program product comprising computer readable program code means for causing a computer to effect the functions of claim 46.

55. An apparatus comprising
a splitting module to perform a table split operation upon a provided set of lookup tables, forming a plurality of split tables;
a masking module to perform a table mask operation upon said collection of split tables and/or other lookup tables forming at least one masked tables;
an aggregating module to perform a table aggregate operation on a subset of said plurality of masked tables, forming at least one aggregate tables; and
a processing module to perform a data processing operation employing a combination of split, masked, aggregate and lookup tables.

56. A computer program product comprising a computer usable medium having computer readable program code means embodied therein for causing resistance to side-channel attacks, the computer readable program code means in said computer program product comprising computer readable program code means for causing a computer to effect the functions of claim 55.

* * * * *